US012807165B2

(12) United States Patent
Kunieda et al.

(10) Patent No.: US 12,807,165 B2
(45) Date of Patent: Nov. 24, 2026

(54) DRIVER ASSISTANCE DEVICE, DRIVER ASSISTANCE SYSTEM, AND DRIVER ASSISTANCE METHOD

(71) Applicant: Panasonic Automotive Systems Co., Ltd., Kanagawa (JP)

(72) Inventors: Nobuyuki Kunieda, Kanagawa Ken (JP); Yukiko Ito, Kyoto Fu (JP); Koichi Emura, Kanagawa Ken (JP); Tomoaki Katada, Nagano Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 47 days.

(21) Appl. No.: 19/037,686

(22) Filed: Jan. 27, 2025

(65) Prior Publication Data

US 2025/0171030 A1 May 29, 2025

Related U.S. Application Data

(63) Continuation of application No. PCT/JP2023/027726, filed on Jul. 28, 2023.

(30) Foreign Application Priority Data

Sep. 20, 2022 (JP) ................................ 2022-148764

(51) Int. Cl.
*B60W 40/09* (2012.01)
*B60W 40/08* (2012.01)
*B60W 50/14* (2020.01)

(52) U.S. Cl.
CPC ............ *B60W 40/09* (2013.01); *B60W 50/14* (2013.01); *B60W 2040/0872* (2013.01);
(Continued)

(58) Field of Classification Search
CPC .. B60W 40/09; B60W 50/14; B60W 2556/10; B60W 2540/221;
(Continued)

(56) References Cited

U.S. PATENT DOCUMENTS

2022/0013006 A1* 1/2022 Srivastava .............. G06F 16/29

FOREIGN PATENT DOCUMENTS

JP 2007-171154 7/2007
JP 2009-101714 5/2009
(Continued)

OTHER PUBLICATIONS

International Search Report (ISR) from International Searching Authority (Japan Patent Office) in International Pat. Appl. No. PCT/JP2023/027726, dated Oct. 17, 2023, together with an English language translation.
(Continued)

*Primary Examiner* — Michael D Lang
(74) *Attorney, Agent, or Firm* — Greenblum & Bernstein, P.L.C.

(57) ABSTRACT

A driver assistance device is configured to calculate a numerical value indicating a level of a cognitive function of the driver based on information detected by detecting at least one of driving behaviors of a vehicle by a driver, biological information during driving, and a behavior of the vehicle; analyze the numerical value as cognitive function characteristics related to one or more different brain functions; store, in time series, the numerical value for the same driver and an analysis result of analyzing the numerical value; calculate degrees of influence of a plurality of variation factors that cause deterioration in the cognitive function of the driver and estimate a main factor, based on a stored content resulting from storing, in time series, the numerical value and the analysis result; and assist the driver based on
(Continued)

an estimation result by estimating the main factor, or information corresponding to the estimation result.

12 Claims, 22 Drawing Sheets

(52) U.S. Cl.
CPC ... *B60W 2050/146* (2013.01); *B60W 2540/22* (2013.01); *B60W 2540/221* (2020.02); *B60W 2556/10* (2020.02)

(58) Field of Classification Search
CPC ... B60W 2040/0872; B60W 2050/146; B60W 2540/22
See application file for complete search history.

(56) References Cited

FOREIGN PATENT DOCUMENTS

| | | |
|---|---|---|
| JP | 2010-067164 | 3/2010 |
| JP | 2011-227883 | 11/2011 |
| JP | 2014-174848 | 9/2014 |
| JP | 2018-126190 | 8/2018 |
| JP | 2019-124975 | 7/2019 |
| JP | 2021-189318 | 12/2021 |

OTHER PUBLICATIONS

"Traffic accident statistical table data: classified by human factors and accident types, total number of accidents (first party)—vehicle", Institute for Traffic Accident Research and Data Analysis, 2020.
Mimura et al., "Automobile Driving and Cognitive Function About the Driving", Japanese Journal of Geriatrics, vol. 55, No. 2, pp. 191-196, 2018.
Supervised by Takao Suzuki, "Basics of mild cognitive impairment (MCI)—aiming at effective prevention of dementia", p. 7-8, p. 34, p. 111-123, p. 225, Igaku-Shoin Ltd., 2015.
Japanese Society of Neurology: "Dementia medical care guideline 2017", Igaku-Shoin Ltd., pp. 19-22, 2017.
Lida et al., "Determination of driving ability of elderly people", Japanese Journal of Geriatrics, vol. 55, No. 2, pp. 202-207, 2018.
Kamimura, "Driving Ability and Assessment of Fitness to Drive for Dementia/Cognitive Decline", The Journal of the International Association of Traffic and Safety Sciences, vol. 42, No. 3, pp. 12-22, 2018.
Urakami, "Dementia and driving", Society of Automotive Engineers of Japan, Inc., vol. 71, No. 12, pp. 90-95, 2017.
Fukuda et al., "Vehicle for a Super-Aged Society: Focusing on One's Way of Being", Cognitive Studies, pp. 259-278, 2018.
Takagi et al., "On the Relationship between Behavior of a Vehicle and Reaction Time of the Driver", Transactions of the Society of Automotive Engineers of Japan, vol. 43, No. 5, pp. 1131-1137, 2012.
Bo et al., "Pitch Angle Estimation Using a Vehicle Mounted Monocular Camera for Vehicle Target Range Measurement", The journal of the Institute of Image Information and Television Engineers, vol. 69, No. 4, pp. J169-J176, 2015.
Kamisaka et al., "Prediction of driving behavior using driver's gaze information", IEICE technical report, MI, medical image 111 (49), pp. 105-110, May 12, 2011.
Yamasaki et al., "Extraction of Driver's Gaze Region by Face Direction Estimation Using On-Board Cameras", Transactions of the Society of Automotive Engineers of Japan, vol. 48, No. 5, pp. 1113-1119, 2017.
Takagi et al., "Traffic Sign Recognition Using SIFT features", IEEJ Transactions on Electronics, Information and Systems, vol. 129, No. 5, pp. 824-831, 2009.
Eby et al., "Maintaining safe mobility in an aging society", Kyoto University Press, pp. 15-33, 2020.
Matsuura, "Safety psychology of elderly driver", University of Tokyo Press, pp. 48-62, 2017.
Isaji et al., "Analysis of the Brake Initiation Timing on the basis of Performance Index for Approach and Alienation", Transactions of the Society of Automotive Engineers of Japan, vol. 41, No. 3, pp. 593-598, 2010.
Nakagawa et al., "Monitoring the Physical Condition of Drivers as they Drive", Denso Technicalreview, vol. 21, 2016.
Watanabe, "Cognitive function and driving", Journal of the Japanese Council of Traffic Science, vol. 17, No. 2, pp. 3-10, 2017.
Kitamura, "Careful driving life, transportation problem laboratory", Kigyo Kaihatsu Center, pp. 44-46, pp. 60-65, pp. 133-136, 2009.
Murata et al., "Visual Information Processing", Characteristics in Predictive Task of Dangerous Situation, ergonomics, vol. 46, No. 6, pp. 393-397, 2010.
Nakata et al., "Cognitive function and environmental stresses", Jpn. J. Biometeor. 56(1): pp. 3-11, 2019.
Sakurai et al., "Influence of Time of Day on Alerting and Cognitive Dysfunction in the Older Adults", Japanese Journal of Applied Psychology, vol. 42, No. 3, pp. 185-193, 2017.
Miyajima et al., "Construction of the operation action database and applied", Institute of Systems, Control and Information Engineers, vol. 55, No. 1, pp. 20-25, 2011.
Inagaki et al., "A Fundamental Analysis on Driving Behavior and Individual Property of Elderly Drivers Based on Driving Recorder Data", vol. 5, No. 2, pp. A_208-A_216, 2019.

* cited by examiner

FIG.6

| INFORMATION TO BE DETECTED \ DRIVING ENVIRONMENT | | STRAIGHT ROADS | CURVED ROADS | INTER-SECTIONS | EXPRESS-WAYS | SCHOOL ROUTES | AT NIGHT | DURING RAIN | WHEN PARKING | ... |
|---|---|---|---|---|---|---|---|---|---|---|
| BIOLOGICAL INFORMATION OF DRIVER | GAZE DIRECTION | ○ | ○ | ○ | ○ | ○ | ○ | ○ | ○ | |
| | FACE DIRECTION | ○ | ○ | ○ | ○ | ○ | ○ | ○ | ○ | |
| | BODY MOVEMENT (CHANGE IN POSITION OF FACE) | ○ | ○ | ○ | ○ | ○ | ○ | ○ | | |
| | NUMBER OF BLINKS, INTERVAL | ○ | ○ | ○ | ○ | ○ | ○ | ○ | | |
| | ⋮ | | | | | | | | | |
| DRIVING BEHAVIOR | DISTRIBUTION STATE OF GAZE POINTS | ○ | ○ | ○ | ○ | ○ | ○ | ○ | | |
| | PRESENCE OR ABSENCE OF VISUAL DISTRACTED DRIVING | ○ | ○ | ○ | ○ | ○ | ○ | ○ | | |
| | PRESENCE OR ABSENCE OF LEFT AND RIGHT CONFIRMATION | ○ | ○ | ○ | ○ | ○ | ○ | ○ | ○ | |
| | PRESENCE OR ABSENCE OF REAR CONFIRMATION | ○ | ○ | ○ | ○ | ○ | ○ | ○ | ○ | |
| | PRESENCE OR ABSENCE OF TEMPORARY STOP | | | ○ | | ○ | ○ | ○ | | |
| | COMPLIANCE WITH TRAFFIC SIGN | ○ | ○ | ○ | ○ | ○ | ○ | ○ | | |
| | COMPLIANCE WITH SIGNAL | ○ | ○ | ○ | | ○ | ○ | ○ | | |
| | CONTINUOUS DRIVING TIME | | | | ○ | | ○ | ○ | | |
| | ⋮ | | | | | | | | | |
| BEHAVIOR OF VEHICLE | VEHICLE SPEED | ○ | ○ | ○ | ○ | ○ | ○ | ○ | ○ | |
| | INTER-VEHICULAR DISTANCE | ○ | ○ | ○ | ○ | ○ | ○ | ○ | | |
| | LANE DEPARTURE | ○ | ○ | ○ | ○ | ○ | ○ | ○ | | |
| | SUDDEN ACCELERATION | ○ | ○ | ○ | ○ | ○ | ○ | ○ | ○ | |
| | SUDDEN DECELERATION | ○ | ○ | ○ | ○ | ○ | ○ | ○ | ○ | |
| | DRIVING TRAJECTORY | ○ | ○ | ○ | ○ | ○ | ○ | ○ | ○ | |
| | ⋮ | | | | | | | | | |

FIG.8

| DETECTED DRIVING BEHAVIOR EXAMPLE | DETERIORATING COGNITIVE FUNCTION |
|---|---|
| ·FORGET CONTENT OF TRAFFIC SIGN | MEMORY ABILITY 80 |
| ·STEPPING ON ACCELERATOR INSTEAD OF BRAKE WRONGLY<br>·PANIC BECAUSE MULTIPLE THINGS CANNOT BE PERFORMED | EXECUTIVE FUNCTION ABILITY 81 |
| ·INSUFFICIENT CHECKING FOR SAFETY IN SURROUNDINGS<br>·OVERLOOKING TRAFFIC SIGNS OR LIKE | ATTENTION ABILITY 82 |
| ·RESPONSE TO DRIVING OPERATION IS DELAYED (BRAKE, HANDLE) | INFORMATION PROCESSING ABILITY 83 |
| ·INTER-VEHICULAR DISTANCE IS TOO SHORT<br>·DEVIATION FROM LANE | VISUAL-SPATIAL COGNITIVE ABILITY 84 |

FIG.9

| ASSISTANCE CONTENT / COGNITIVE FUNCTION LEVEL | DRIVING ASSISTANCE BY INFORMATION PROVISION (TRAINING MODE) | DRIVING ASSISTANCE USING DRIVING ASSISTANCE FUNCTIONS (DRIVING ASSISTANCE MODE) |
| --- | --- | --- |
| SAFETY | × | × |
| CAUTION | ○ | ○ |
| DANGER | × | ○ |

FIG.10

| ASSISTANCE CONTENT / DETERIORATING COGNITIVE FUNCTION CHARACTERISTICS | TRAINING MODE | DRIVING ASSISTANCE MODE |
| --- | --- | --- |
| MEMORY ABILITY 80 | MESSAGE CONVEYING CONTENT OF TRAFFIC SIGN<br>DETAILED ROUTE GUIDANCE | TRAFFIC SIGN RECOGNITION |
| EXECUTIVE FUNCTION ABILITY 81 | MESSAGE RECOMMENDING EARLY BRAKING | COLLISION WARNING<br>MAINTAIN INTER-VEHICULAR DISTANCE<br>PREVENT SUDDEN ACCELERATION |
| ATTENTION ABILITY 82 | GUIDANCE ON DRIVING ENVIRONMENT<br>GUIDANCE ON DRIVING BEHAVIOR | PEDESTRIAN DETECTION<br>MAINTAIN INTER-VEHICULAR DISTANCE |
| INFORMATION PROCESSING ABILITY 83 | MESSAGES ENCOURAGING BREAKS | MAINTAIN INTER-VEHICULAR DISTANCE<br>COLLISION WARNING |
| VISUAL-SPATIAL COGNITIVE ABILITY 84 | GUIDANCE ON DRIVING ENVIRONMENT | MAINTAIN INTER-VEHICULAR DISTANCE<br>PREVENTION LANE DEPARTURE<br>PARKING ASSISTANCE |

| | STATE 1 | STATE 2 | STATE 3 | STATE 4 | STATE 5 | STATE 6 | STATE 7 | STATE 8 |
|---|---|---|---|---|---|---|---|---|
| AGING FACTOR | + | + | + | + | − | − | − | − |
| SKILL FACTOR | + | + | − | − | + | + | − | − |
| HEALTH FACTOR | + | − | + | − | + | − | + | − |

+: BETTER THAN THRESHOLD, −: WORSE THAN THRESHOLD

FIG.15

| BEFORE STATE TRANSITION | | AFTER STATE TRANSITION | | | | | | | |
|---|---|---|---|---|---|---|---|---|---|
| | | STATE 1 | STATE 2 | STATE 3 | STATE 4 | STATE 5 | STATE 6 | STATE 7 | STATE 8 |
| | | AGING: + SKILL: + HEALTH: + | AGING: + SKILL: + HEALTH: - | AGING: + SKILL: - HEALTH: + | AGING: + SKILL: - HEALTH: - | AGING: - SKILL: + HEALTH: + | AGING: - SKILL: + HEALTH: - | AGING: - SKILL: - HEALTH: + | AGING: - SKILL: - HEALTH: - |
| STATE 1 | AGING: + SKILL: + HEALTH: + | NO CHANGE | (b) DETERIORAT-ING HEALTH | (c) DETERIORAT-ING SKILL | (c) DETERIORAT-ING SKILL (b) DETERIORAT-ING HEALTH | (a) EFFECTS OF AGING | (b) DETERIORAT-ING HEALTH (a) EFFECTS OF AGING | (c) DETERIORAT-ING SKILL (a) EFFECTS OF AGING | (c) DETERIORAT-ING SKILL (b) DETERIORAT-ING HEALTH (a) EFFECTS OF AGING |
| STATE 2 | AGING: + SKILL: + HEALTH: - | (B) IMPROVED HEALTH | NO CHANGE | (c) DETERIORAT-ING SKILL (B) IMPROVED HEALTH | (c) DETERIORAT-ING SKILL | (B) IMPROVED HEALTH (a) EFFECTS OF AGING | (a) EFFECTS OF AGING | (c) DETERIORAT-ING SKILL (B) IMPROVED HEALTH (a) EFFECTS OF AGING | (c) DETERIORAT-ING SKILL (a) EFFECTS OF AGING |
| STATE 3 | AGING: + SKILL: - HEALTH: + | (C) IMPROVED SKILL | (C) IMPROVED SKILL (b) DETERIORAT-ING HEALTH | NO CHANGE | (b) DETERIORAT-ING HEALTH | (C) IMPROVED SKILL (a) EFFECTS OF AGING | (C) IMPROVED SKILL (b) DETERIORAT-ING HEALTH (a) EFFECTS OF AGING | (a) EFFECTS OF AGING | (b) DETERIORAT-ING HEALTH (a) EFFECTS OF AGING |
| STATE 4 | AGING: + SKILL: - HEALTH: - | (C) IMPROVED SKILL (B) IMPROVED HEALTH | (C) IMPROVED SKILL | (B) IMPROVED HEALTH | NO CHANGE | (C) IMPROVED SKILL (B) IMPROVED HEALTH (a) EFFECTS OF AGING | (C) IMPROVED SKILL (a) EFFECTS OF AGING | (B) IMPROVED HEALTH (a) EFFECTS OF AGING | (a) EFFECTS OF AGING |
| STATE 5 | AGING: - SKILL: + HEALTH: + | (A) AGING RECOVERY | (b) DETERIORAT-ING HEALTH (A) AGING RECOVERY | (c) DETERIORAT-ING SKILL (A) AGING RECOVERY | (c) DETERIORAT-ING SKILL (b) DETERIORAT-ING HEALTH (A) AGING RECOVERY | NO CHANGE | (b) DETERIORAT-ING HEALTH | (c) DETERIORAT-ING SKILL | (c) DETERIORAT-ING SKILL (b) DETERIORAT-ING HEALTH |
| STATE 6 | AGING: - SKILL: + HEALTH: - | (B) IMPROVED HEALTH (A) AGING RECOVERY | (A) AGING RECOVERY | (c) DETERIORAT-ING SKILL (B) IMPROVED HEALTH (A) AGING RECOVERY | (c) DETERIORA-TING SKILL (A) AGING RECOVERY | (B) IMPROVED HEALTH | NO CHANGE | (c) DETERIORAT-ING SKILL (B) IMPROVED HEALTH | (c) DETERIORA-TING SKILL |
| STATE 7 | AGING: - SKILL: - HEALTH: + | (C) IMPROVED SKILL (A) AGING RECOVERY | (C) IMPROVED SKILL (b) DETERIORAT-ING HEALTH (A) AGING RECOVERY | (A) AGING RECOVERY | (b) DETERIORAT-ING HEALTH (A) AGING RECOVERY | (C) IMPROVED SKILL | (C) IMPROVED SKILL (b) DETERIORAT-ING HEALTH | NO CHANGE | (b) DETERIORATING HEALTH |
| STATE 8 | AGING: - SKILL: - HEALTH: - | (C) IMPROVED SKILL (B) IMPROVED HEALTH (A) AGING RECOVERY | (C) IMPROVED SKILL | (B) IMPROVED HEALTH (A) AGING RECOVERY | (A) AGING RECOVERY | (C) IMPROVED SKILL (B) IMPROVED HEALTH | (C) IMPROVED SKILL | (B) IMPROVED HEALTH | NO CHANGE |

+: BETTER THAN THRESHOLD, -: WORSE THAN THRESHOLD

FIG.16

| | AGING FACTOR | HEALTH FACTOR | SKILL FACTOR | ANALYSIS RESULTS | EXAMPLES OF INFORMATION PRESENTATION |
|---|---|---|---|---|---|
| STATE 1 | + | + | + | IN GOOD CONDITION | HEALTH IS GOOD<br>DRIVE SAFELY |
| STATE 2 | + | + | - | SKILL PROBLEMS | DRIVING SKILL IS DETERIORATING<br>DIFFICULT ROADS ARE INDICATED,<br>SO BE ESPECIALLY CAREFUL |
| STATE 3 | + | - | + | POOR HEALTH | HEALTH FACTOR SCORE HAS DECREASED<br>DRIVE MORE CAREFULLY THAN USUAL |
| STATE 4 | + | - | - | POOR HEALTH AND SKILL PROBLEMS | HEALTH FACTOR SCORE HAS DECREASED<br>ROUTE GUIDANCE WILL AVOID DIFFICULT ROADS |
| STATE 5 | - | + | + | FUNCTION DETERIORATION DUE TO AGING | AGING FACTOR SCORE HAS DECREASED<br>RECOMMEND TO CARRY OUT RECOVERY TRAINING |
| STATE 6 | - | + | - | AGING AND SKILL DETERIORATION | AGING FACTOR SCORE AND SKILL HAVE DECREASED<br>RECOMMEND TO CARRY OUT RECOVERY TRAINING |
| STATE 7 | - | - | + | COGNITIVE FUNCTION DETERIORATION DUE TO AGING AND POOR HEALTH | AGING FACTOR SCORE AND HEALTH FACTOR SCORE HAVE DECREASED.<br>DRIVE CAREFULLY |
| STATE 8 | - | - | - | OVERALL POOR HEALTH | COGNITIVE FUNCTION SCORE HAS DECREASED OVERALL, WHICH IS AFFECTING SAFE DRIVING.<br>RECOMMEND TO TAKE A BREAK |

+: BETTER THAN THRESHOLD, -: WORSE THAN THRESHOLD

FIG.17

| | | AFTER CHANGE | |
|---|---|---|---|
| | | AGING FACTOR +(GOOD) | AGING FACTOR -(POOR) |
| BEFORE CHANGE | AGING FACTOR +(GOOD) | (STATE TRANSITION A) NO DETERIORATION OF COGNITIVE FUNCTION DUE TO AGING FACTOR NO INFORMATION PRESENTATION | (STATE TRANSITION B) DETERIORATION OF COGNITIVE FUNCTION "AGING FACTOR SCORE DECREASES. RECOMMEND RECOVERY TRAINING." |
| | AGING FACTOR -(POOR) | (STATE TRANSITION C) COGNITIVE FUNCTION IS RECOVERED "DECREASE IN AGING FACTOR SCORE IS IMPROVED. IT SEEMS THAT THERE WAS EFFECT OF RECOVERY TRAINING." | (STATE TRANSITION D) DETERIORATION IN COGNITIVE FUNCTION DUE TO AGING FACTOR CONTINUES "AGING FACTOR SCORE CONTINUES TO DECREASE. CONTINUE RECOVERY TRAINING." |

FIG.18

| | | AFTER CHANGE | |
|---|---|---|---|
| | | HEALTH FACTOR +(GOOD) | HEALTH FACTOR -(POOR) |
| BEFORE CHANGE | HEALTH FACTOR +(GOOD) | (STATE TRANSITION E)<br>CONTINUED GOOD HEALTH<br>NO INFORMATION PRESENTATION | ((STATE TRANSITION F)<br>HEALTH IS DETERIORATED<br>"HEALTH FACTOR SCORE HAS DECREASED. DRIVE MORE CAREFULLY THAN USUAL" |
| | HEALTH FACTOR -(POOR) | (STATE TRANSITION G)<br>HEALTH IS IMPROVED<br>"HEALTH FACTOR SCORE IS IMPROVED. PLEASE CONTINUE SAFE DRIVING." | (STATE TRANSITION H)<br>HEALTH IS NOT IMPROVED<br>"HEALTH FACTOR SCORE IS DECREASED, WHICH AFFECTS SAFE DRIVING. BREAK IS RECOMMENDED." |

FIG.19

| | | AFTER CHANGE | |
|---|---|---|---|
| | | SKILL FACTOR +(GOOD) | SKILL FACTOR -(POOR) |
| BEFORE CHANGE | SKILL FACTOR +(GOOD) | (STATE TRANSITION I)<br>DETERIORATION OF COGNITIVE FUNCTION DUE TO SKILL FACTOR IS NOT OBSERVED<br>NO INFORMATION PRESENTATION | (STATE TRANSITION J)<br>SKILL DETERIORATION<br>CAUTION TO AVOID OVERCONFIDENCE<br>(OVERCONFIDENCE DISMISSAL)<br>"DRIVING SKILL IS DETERIORATING. DRIVE CAREFULLY WITHOUT OVERCONFIDENCE." |
| | SKILL FACTOR -(POOR) | (STATE TRANSITION K)<br>SKILL IS IMPROVED<br>MAKE INFORMAION OF SKILL IMPROVEMENT WHILE GIVING WARNING<br>(DISTRUST DISMISSAL)<br>"DRIVING SKILLS HAS BEEN IMPROVED. CONTINUE TO DRIVE SAFELY." | (STATE TRANSITION L)<br>DETERIORATION IN COGNITIVE FUNCTION DUE TO SKILL FACTOR CONTINUES<br>WARNING AND SKILL IMPROVING TRAINING IS PROMPTED<br>"DRIVING SKILL HAS DETERIORATED. FOR SAFE DRIVING, PAY ATTENTION." |

DRIVER ASSISTANCE DEVICE, DRIVER ASSISTANCE SYSTEM, AND DRIVER ASSISTANCE METHOD

CROSS-REFERENCE TO RELATED APPLICATIONS

This application is a continuation of International Application No. PCT/JP2023/027726, filed on Jul. 28, 2023 which claims the benefit of priority of the prior Japanese Patent Application No. 2022-148764, filed on Sep. 20, 2022, the entire contents of which are incorporated herein by reference.

FIELD

The present disclosure relates to a driver assistance device, a driver assistance system, and a driver assistance method.

BACKGROUND

When analyzing traffic accidents by human factor, "delay in finding" such as inattention to the front (including cognitive distracted driving and visual distracted driving) and unconfirmation of safety accounts for about 80% (Nonpatent Literature 1: Traffic Accident Research and Data Analysis: "Total Number of Accidents by Human Factor and Accident Type (1)—Vehicle", 2020). That is, the main factor is cognition part of "cognition, decision, and action" in driving. Factors that affect the cognitive function deterioration related to driving include neuropsychiatric diseases including drowsiness, alcohol/drugs, aging, dementia, and higher brain dysfunction (Nonpatent Literature 2: Mimura Masaru, Fujita Yoshio, "Automobile Driving and Cognitive Function About the Driving", Clinical Practice of Geriatrics, vol. 55, No. 2, pp. 191-196, 2018). Therefore, it is considered that traffic accidents can be reduced when it is possible to prevent deterioration of the cognitive function during driving caused by various factors. In addition, human cognitive function, driver's cognitive function, driver's behavior analysis during driving, and the like have been studied from various viewpoints as disclosed in Nonpatent Literature 1, Nonpatent Literature 2, Nonpatent Literature 3: Suzuki Takao, Supervised: "Underlying Mild Cognitive Impairment (MCI), Toward Effective Dementia Prevention", p. 7-8, p. 34, pp. 111-123, p. 225, Igaku-Shoin, 2015, Nonpatent Literature 4: Japanese Society of Neurology: "Clinical Practice Guideline for Dementia 2017", Igaku-Shoin, pp. 19-22, 2017, Nonpatent Literature 5: Iida Shinya, Kato Noriaki, Hachisuka Kenji, Saeki Satoru: "Determination of Driving Ability of Elderly People", Clinical Practice of Geriatrics, vol. 55, No. 2, pp. 202-207, 2018, Nonpatent Literature 6: Kamimura Naoto: "Driving Ability and Assessment of Fitness to Drive for Dementia/Cognitive Decline", International Association of Traffic and Safety Sciences, vol. 42, No. 3, pp. 12-22, 2018, Nonpatent Literature 7: Urakami Katsuya, "Dementia and Driving", Automotive Engineers, vol. 71, No. 12, pp. 90-95, 2017, Nonpatent Literature 8: Fukuda Ryoko, Harada Fumio, and Okumura Daisaku: "Vehicle for a Super-Aged Society: Focusing on One's Way of Being", Cognitive Studies, 25 (3), pp. 259-278, 2018. 09, Nonpatent Literature 9: Takagi Shinya and Yamada Keiichi: "On the Relationship between Behavior of a Vehicle and Reaction Time of the Driver", Journal of Society of Automotive Engineers, VOL. 43, No. 5, pp. 1131-1137, 2012, Nonpatent Literature 10: Li Bo, Zhang Xiaolin, and Sato Makoto: Pitch Angle Estimation Using a Vehicle Mounted Monocular Camera for Vehicle Target Range Measurement, The Journal of The Institute of Image Information and Television engineers, vol. 69, No. 4, pp. J169-J176, 2015, Nonpatent Literature 11: Kamisaka Tatsuki, Noda Masafumi, Mekada Yoshito, Deguchi Daisuke, Ide Ichiro, and Murase Hiroshi, "Prediction of the Driving Behavior Using Driver's Gaze Information": "IEICE Technical Report, MI, Medical image 111 (49), 105-110, 2011 May 12, Nonpatent Literature 12: YAMASAKI Akito, Pongsathorn Raksincharoensak, and Shino Motoki, "Extraction of Driver's Gaze Region by Face Direction Estimation Using On-Board Cameras", Journal of Society of Automotive Engineers, VOL. 48, No. 5, pp. 1113-1119, 2017, Nonpatent Literature 13: Takaki Masanari, Fujiyoshi Hironobu: "Traffic Sign Recognition Using SIFT Features", Journal of The Institute of Electrical Engineers of Japan. C, vol. 129, No. 5, pp. 824-831, 2009, Nonpatent Literature 14: (Etsuo HORIKAWA, edited and translated by Tomoko MINE) written by David W. Eby, Lisa J. Molnar, and Paula S. Kartje, "Maintaining Safe in an Aging Society (Human Factors in Transportation)", Kyoto University Press, pp. 15-33, 2020, Nonpatent Literature 15: Matsuura Tsuneo: "Safety Psychology for the Older Driver", University of Tokyo Press, pp. 48-62, 2017, Nonpatent Literature 16: Isaji Kazuyoshi, Naohiko Tsuru, Wada Takahiro, Doi Shunichi, Kaneko Hiroshi: "Analysis of the Brake Initiation Timing Based on Performance Index for Approach and Alienation", Journal of Society of Automotive Engineers, vol. 41, No. 3, pp. 593-598, 2010, Nonpatent Literature 17: Nakagawa Tsuyoshi, et al., "Monitoring the Physical Condition of Drivers as they Drive", DENSO TECHNICAL REVIEW, vol. 21, 2016, Nonpatent Literature 18: Watanabe Shu, "Cognition and Driving Ability", Journal of the Japan Council of Traffic Science, vol. 17, No. 2, pp. 3-10, 2017, Nonpatent Literature 19: Kitamura Noriyasu: "Safe Driving Life Span", Kigyo Kaihatsu Center, Transportation Research Lab, pp. 44-46, pp. 60-65, pp. 133-136, 2009, Nonpatent Literature 20: Murata Atsuo, Moriwaka Makoto, "Visual Information Processing Characteristics in Prediction Task of Dangerous Situation Comparison of Characteristics between Novice and Expert Drivers", Ergonomics, Vol. 46, No. 6, pp. 393-397, 2010, Nonpatent Literature 21: Nakata Hiroki, Shibasaki Manabu: "Cognitive Function and Environmental Stresses", Journal of Japanese Society of Biometeorology, 56 (1), 3-11, 2019, Nonpatent Literature 22: Sakurai Miyuki and Iwazaki Shoichi: "Influence of Time of Day on Alerting and Cognitive Dysfunction in the Older Adults", Japanese Journal of Applied Psychology, Vol. 42, No. 3, pp. 185-193, 2017, Nonpatent Literature 23: Miyajima Chiyomi and Takeda Kazuya "Construction and Application of the Driving Behavior Database", Vol. 55, No. 1, pp. 20-25, 2011, and Nonpatent Literature 24: Inagaki Tomoyuki, Harada Noritake, Kashiwa Yuki, Takehira Seiji, and Kobayakawa Satoru, "A Fundamental Analysis on Driving Behavior and Individual Property of Elderly Drivers on Driving Recorder Data", Vol. 5, No. 2, pp. A_208-A216, 2019.

JP 2009-101714 A discloses a driving assistance device that detects a state in which driving ability is deteriorated due to drinking, dozing, or the like and notifies the driver of the deterioration in driving ability. In addition, JP 2019-124975 A discloses a dementia risk determination system that can detect traffic violations that are likely to be performed when cognitive function deteriorates and determine whether a driver can drive.

In JP 2009-101714 A and JP 2019-124975 A, estimation of a factor that the cognitive function has deteriorated has not been performed.

An object of the present disclosure is to provide a driver assistance device, a driver assistance system, and a driver assistance method capable of estimating a factor of deterioration in the cognitive function of a driver.

The present disclosure discloses an improved invention of the previously filed application (JP 2021 052309 A). Therefore, in the present specification, the contents described in the previous application are cited as appropriate.

SUMMARY

A driver assistance device according to the present disclosure includes a memory, and a processor coupled to the memory. The processor is configured to detect at least one of driving behaviors of a vehicle by a driver, biological information during driving of the driver, and a behavior of the vehicle; calculate a numerical value indicating a level of a cognitive function of the driver based on information detected by detecting the at least one of the driving behaviors, the biological information, and the behavior of the vehicle; analyze the numerical value as cognitive function characteristics related to one or more different brain functions; store, in time series, the numerical value for the same driver and an analysis result of analyzing the numerical value; calculate degrees of influence of a plurality of variation factors that cause deterioration in the cognitive function of the driver and estimate a main factor, based on a stored content resulting from storing, in time series, the numerical value and the analysis result; and assist the driver based on an estimation result by estimating the main factor, or information corresponding to the estimation result.

BRIEF DESCRIPTION OF THE DRAWINGS

FIG. 6 is a diagram for explaining an example of information detected by a driving state detection unit;

FIG. 8 is a diagram for explaining a relationship between cognitive function characteristics related to different brain functions and driving behaviors generated during driving;

FIG. 9 is a first diagram for explaining an example of assistance contents performed by the driver assistance device according to the cognitive function characteristics;

FIG. 10 is a second diagram for explaining an example of assistance contents performed by the driver assistance device according to the cognitive function characteristics;

FIG. 15 is a diagram illustrating an example of a temporal change in a cognitive function level of a driver;

FIG. 16 is a diagram illustrating an example of information presentation contents corresponding to a variation in the cognitive function level;

FIG. 17 is a diagram illustrating an example of information to be presented to a driver when a main factor of the cognitive function deterioration is an aging factor;

FIG. 18 is a diagram illustrating an example of information to be presented to a driver when a main factor of the cognitive function deterioration is a health factor;

FIG. 19 is a diagram illustrating an example of information to be presented to a driver when a main factor of the cognitive function deterioration is a skill factor;

DETAILED DESCRIPTION

Hereinafter, an embodiment of a driver assistance device according to the present disclosure will be described with reference to the drawings.

(Description of Cognitive Functional Characteristics)

Figure 1A:
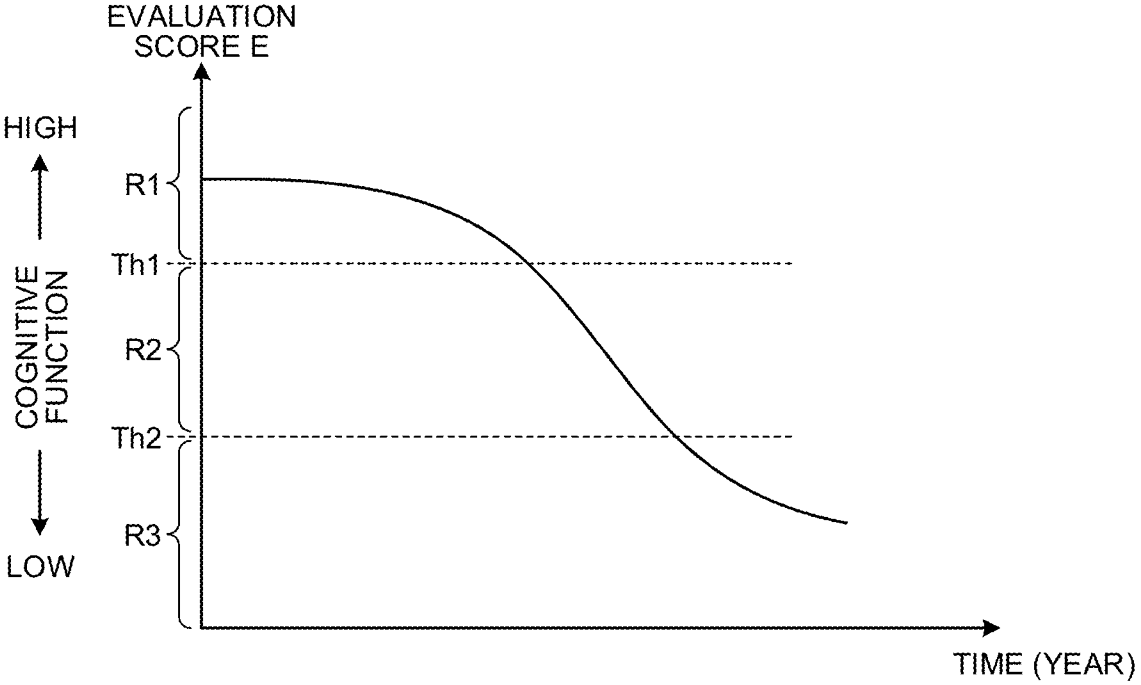
FIG. 1A is a diagram for explaining how cognitive function characteristics deteriorate with aging.
Figure 1B:
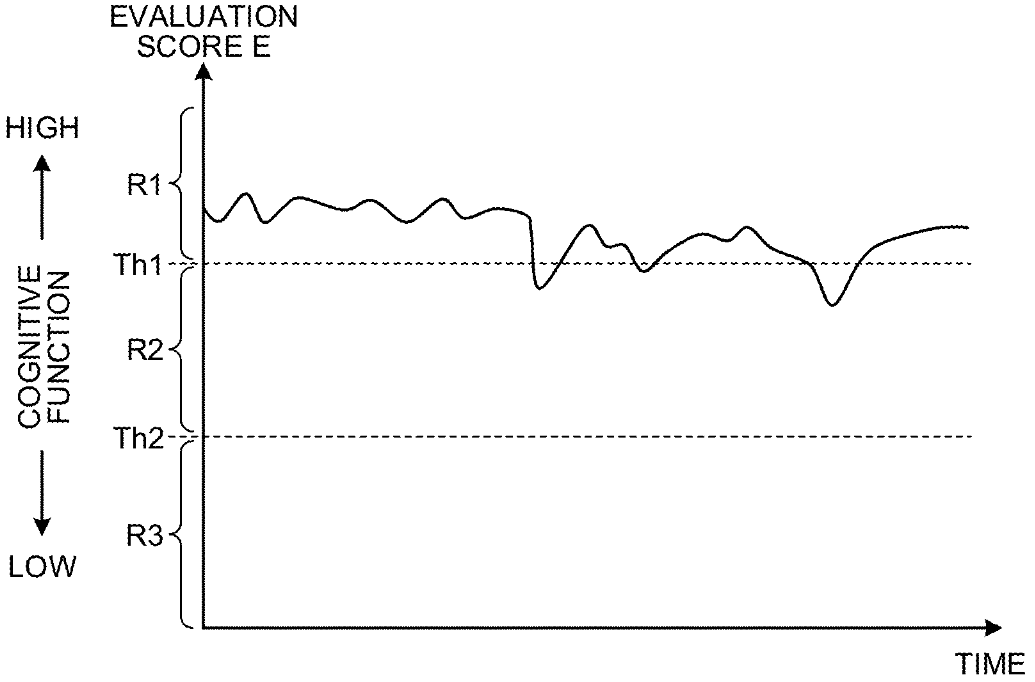
FIG. 1B is a diagram for explaining how cognitive function characteristics deteriorate with time.
Figure 2:
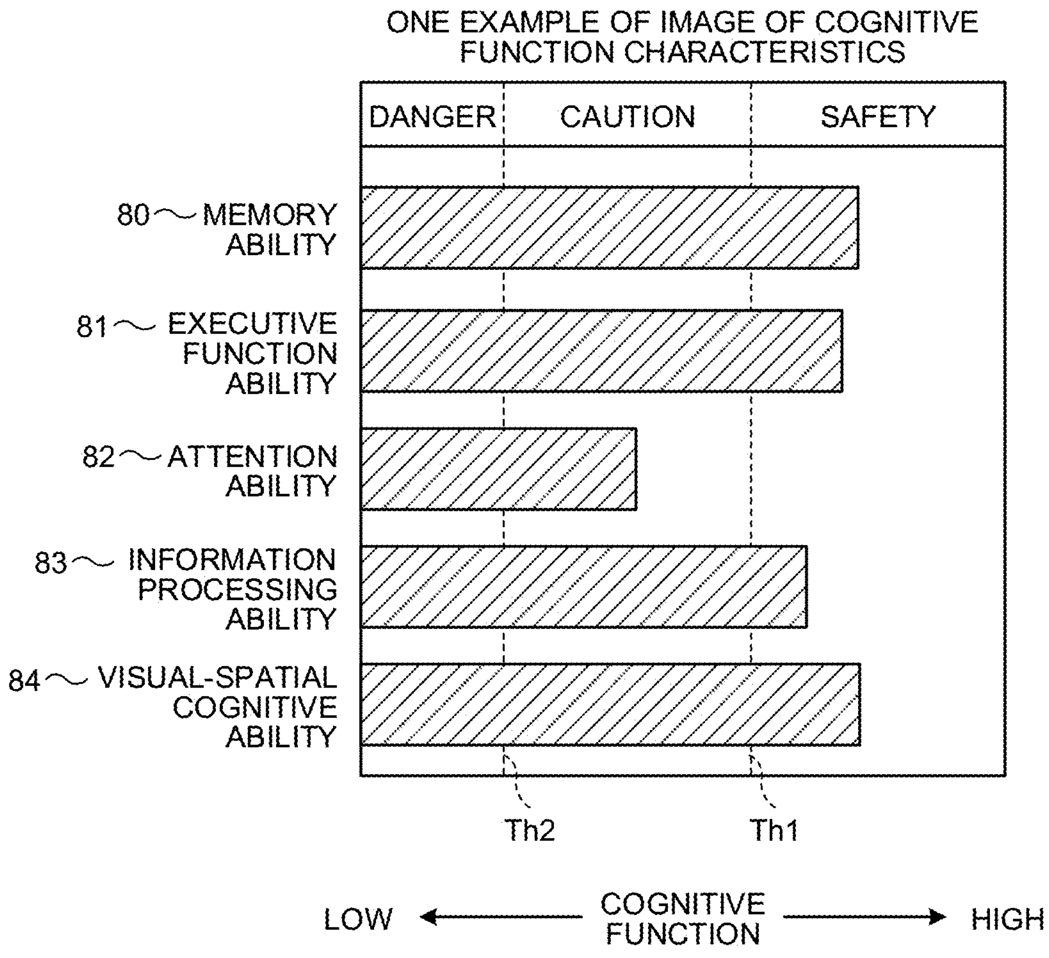
FIG. 2 is a diagram for explaining cognitive function characteristics determined by a driver assistance device according to an embodiment.

The cognitive function characteristics of the driver will be described with reference to FIGS. 1A, 1B, and 2. FIG. 1A is a diagram for explaining how cognitive function deteriorates with aging. FIG. 1B is a diagram for explaining how cognitive function deteriorates with time. In particular, FIG. 1B is a diagram for explaining a state of the cognitive function deterioration associated with time shorter than that in FIG. 1A. FIG. 1A illustrates a variation in a unit of year, and FIG. 1B illustrates a variation in a driving time. FIG. 2 is a diagram for explaining cognitive function characteristics determined by a driver assistance device according to the embodiment.

As illustrated in FIG. 1A, the cognitive function may decrease with age (Nonpatent Literature 3). In addition, as illustrated in FIG. 1B, the variation with time also occurs in daily life (Nonpatent Literature 22). Here, a numerical value indicating whether the cognitive function is high or low is referred to as an evaluation score E of the cognitive function level. When the evaluation score E of the cognitive function level calculated by an appropriate evaluation method exceeds a first threshold Th1, that is, when the evaluation score E of the cognitive function level is in a region R1, it is determined that the cognitive function is in a state of maintaining safe driving. Then, in a case where the evaluation score E of the cognitive function level falls below the first threshold Th1 and exceeds a second threshold Th2 smaller than the first threshold Th1, that is, in a case where the evaluation score E of the cognitive function level is in the region R2, it is determined that the cognitive function is in the "caution" state where there is a problem in continuing safe driving. Furthermore, in a case where the evaluation score E of the cognitive function level is smaller than the second threshold Th2, that is, in a case where the evaluation score E of the cognitive function level is in a region R3, it is determined to be in the "dangerous" state in which the cognitive function level has decreased to such an extent that it is difficult to continue driving. The cognitive function characteristics of the driver may be measured by a cognitive function test by a doctor such as Mini-Mental State Examination (MMSE) (Nonpatent Literature 3), but it is assumed here to quantify a cognitive function that varies with time during driving.

Note that, also in a case where cognitive distracted driving is performed, in a case of visual distracted driving, or in a case where attention ability temporarily deteriorated, the cognitive function is deteriorated as illustrated in FIG. 1B. In addition, even in a case where the cognitive function is deteriorated by aging or in a case of mild cognitive impairment (MCI), the cognitive function similar to that illustrated in FIGS. 1A and 1B can be evaluated, and variation is also observed.

A driver assistance device 10 of the present embodiment quantifies the cognitive function of the driver. Then, the state of the cognitive function characteristics is analyzed based on the quantified value. Furthermore, appropriate driving assistance is performed based on the analysis result.

Note that the cognitive function can be classified into a plurality of different cognitive functions related to different brain sites (brain functions) (Nonpatent Literature 3). In the driver assistance device 10 of the present embodiment, a plurality of different cognitive functions illustrated in FIG. 2 are evaluated with reference to Nonpatent Literature 3. Specifically, there are a memory ability 80, an executive function ability 81, an attention ability 82, an information processing ability 83, and a visual-spatial cognitive ability 84. The influence on driving due to deterioration of each cognitive function is disclosed in Nonpatent Literature 2, Nonpatent Literature 5, Nonpatent Literature 6, and Nonpatent Literature 7. Although five are selected as the evaluation target of the cognitive function in FIG. 2, only one or an optional combination of two or more may be used. In addition, a cognitive function not described herein may be an evaluation target.

The memory ability 80 is the cognitive function that stores new experience and reproduces the experience in consciousness and behavior (Nonpatent Literature 4). In terms of the driving behavior, the memory ability 80 is reflected in, for example, an ability to hold information described on a traffic sign, an ability to store where to go, and the like (Nonpatent Literature 5).

The executive function ability 81 is a cognitive function of making a plan with a purpose, executing an object, and advancing while feeding back the result (Nonpatent Literature 4). In terms of the driving behavior, the executive function ability 81 is reflected in, for example, ability to correctly press an accelerator and a brake, ability to perform a plurality of pieces of information processing, and the like (Nonpatent Literature 5).

The attention ability 82 is a cognitive function that serves as a basis for accepting and selecting a surrounding stimulus and performing a consistent behavior on the stimulus (Nonpatent Literature 4). In terms of the driving behavior, the attention ability 82 is reflected in, for example, ability to pay attention to surrounding environment such as a traffic sign or a signal (Nonpatent Literature 5).

The information processing ability 83 is a cognitive function of executing a designated work within a certain period of time (Nonpatent Literature 3). In terms of the driving behavior, the information processing ability 83 is reflected in, for example, ability to find danger and cope with the danger during driving (Nonpatent Literature 15).

The visual-spatial cognitive ability 84 is a cognitive function that processes information viewed with eyes and grasps a state of a space. In light of the driving behavior, the visual-spatial cognitive ability 84 is reflected in, for example, an ability to keep a sense of distance to a preceding vehicle correctly, an ability to prevent a vehicle from straying from a lane at the time of a curve, or the like (Nonpatent Literature 5).

As illustrated in FIGS. 1A and 1B, it is known that these cognitive functions vary with aging and time (Nonpatent Literature 3). That is, as illustrated in FIG. 2, the degree of each cognitive function can be evaluated by the magnitude relationship between the first threshold Th1 and the second threshold Th2 in each of the above-described cognitive functions. In FIG. 2, the horizontal axis is normalized, and the first threshold Th1 and the second threshold Th2 for each cognitive function are not necessarily the same value.

(Overall Configuration of Driver Assistance Device)

Figure 3:
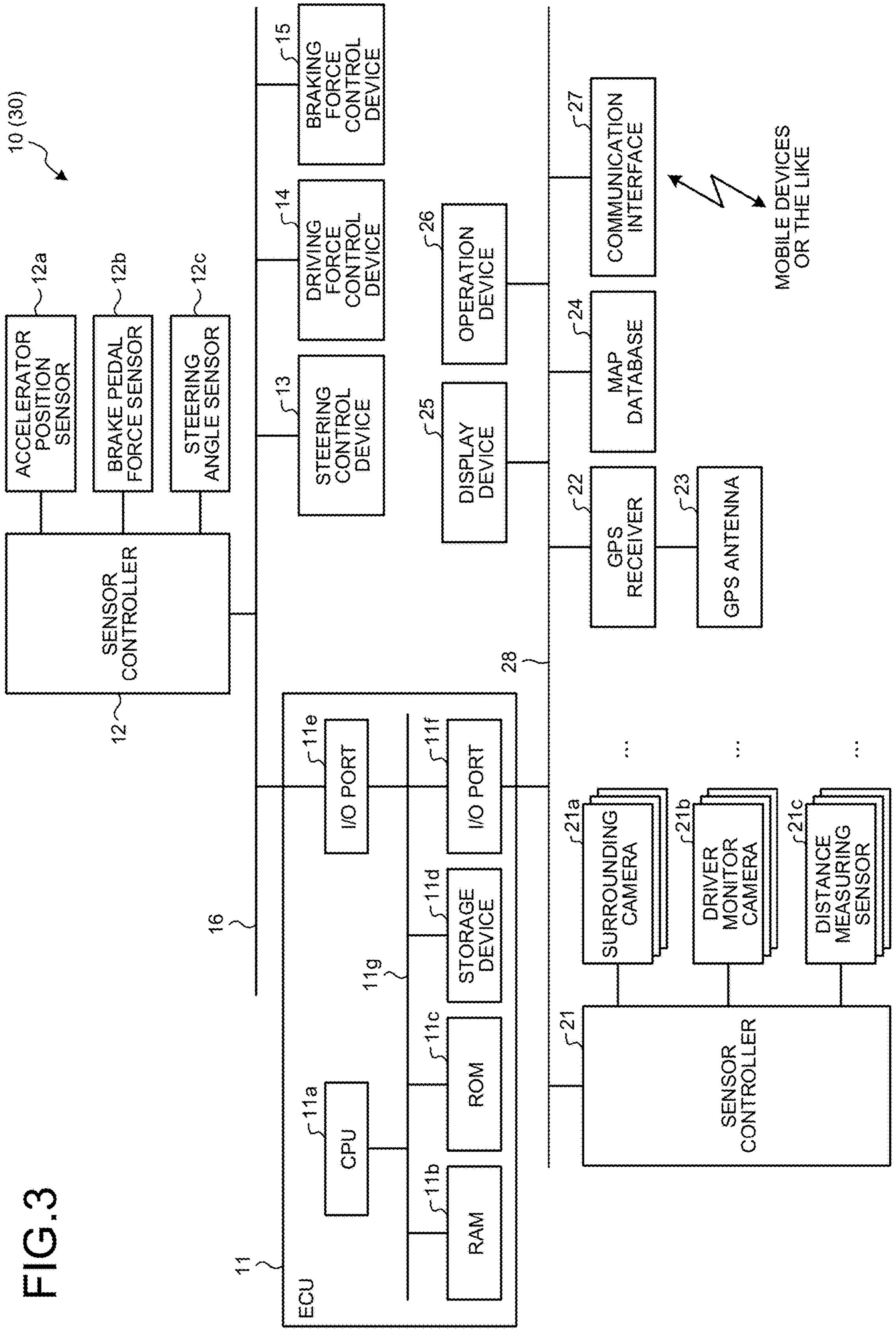
FIG. 3 is a hardware block diagram illustrating an example of a hardware configuration of the driver assistance device according to the embodiment.
Figure 4:
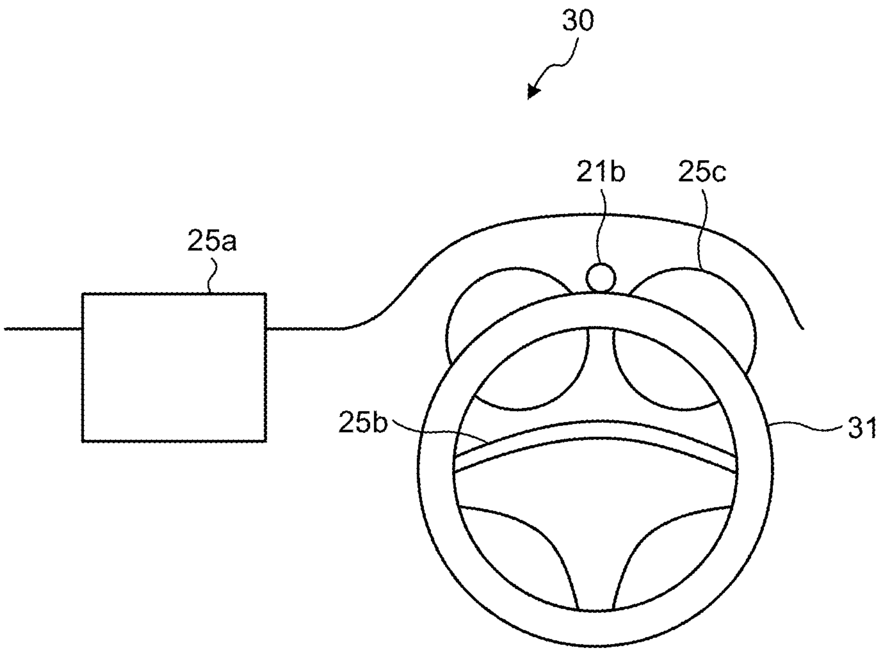
FIG. 4 is an external view illustrating an example of a cockpit of a vehicle on which the driver assistance device according to the embodiment is mounted.

An overall configuration of the driver assistance device 10 will be described with reference to FIGS. 3 and 4. FIG. 3 is a hardware block diagram illustrating an example of a hardware configuration of the driver assistance device according to the embodiment. FIG. 4 is an external view illustrating an example of a cockpit of a vehicle on which the driver assistance device according to the embodiment is mounted.

The driver assistance device 10 calculates an evaluation score E of the cognitive function level of the driver of a vehicle 30, and performs driving assistance corresponding to a deterioration in the cognitive function of the driver.

The driver assistance device 10 includes an ECU (Electronic Control Unit) 11, sensor controllers 12 and 21, a steering control device 13, a driving force control device 14, a braking force control device 15, a GPS receiver 22, a map database 24, a display device 25, an operation device 26, and a communication interface 27.

The ECU 11 is configured as a computer including, for example, a CPU (Central Processing Unit) 11*a*, a RAM (Random Access Memory) 11*b*, and a ROM (Read Only Memory) 11*c*. The ECU 11 may include a storage device 11*d* including a hard disk drive (HDD) or the like. The ECU 11 also includes input/output (I/O) ports 11*e* and 11*f* capable of transmitting and receiving detection signals and various types of information to and from various sensors and the like. The I/O port 11*e* is connected to a bus line 16 through which information related to travel control of the vehicle 30 flows, and controls input and output of information related to a control system that performs various travel assistances of the vehicle 30. The I/O port 11*f* is connected to a bus line 28 through which information related to the information system of the vehicle 30 flows, and controls input and output of information related to detection of the driving behavior of the driver and information presented to the driver.

The RAM 11*b*, the ROM 11*c*, the storage device 11*d*, and the I/O ports 11*e* and 11*f* of the ECU 11 are configured to be able to transmit and receive various types of information to and from the CPU 11*a* via an internal bus 11*g*.

The ECU 11 controls various pieces of processing performed by the driver assistance device 10 by the CPU 11*a* reading and executing a program installed in the ROM 11*c*.

Note that the program executed by the driver assistance device 10 of the present embodiment may be provided by being incorporated in the ROM 11*c* in advance, or may be provided by being recorded in a computer-readable recording medium such as a CD-ROM, a flexible disk (FD), a CD-R, or a digital versatile disk (DVD) as a file in an installable format or an executable format.

Furthermore, the program executed by the driver assistance device 10 of the present embodiment may be configured to be stored on a computer connected to a network such as the Internet and provided by being downloaded via the network. In addition, the program executed by the driver assistance device 10 of the present embodiment may be provided or distributed via a network such as the Internet.

The storage device 11*d* stores a table and the like for calculating the evaluation score E of the cognitive function level of the driver. Details will be described later.

The sensor controller 12 acquires a sensor output for detecting the behavior of the vehicle 30 and delivers the sensor output to the ECU 11. For example, an accelerator position sensor 12*a*, a brake pedal force sensor 12*b*, a steering angle sensor 12*c*, and the like are connected to the sensor controller 12. Note that the sensors connected to the sensor controller 12 are not limited to these examples, and other sensors may be connected.

The accelerator position sensor 12*a* detects a degree of depression (accelerator opening) of an accelerator of the vehicle 30.

The brake pedal force sensor 12*b* detects a pedal force on the brake pedal of the vehicle 30, that is, a stepping force of the brake pedal.

The steering angle sensor 12*c* detects a steering direction and a steering amount of a steering wheel of the vehicle 30.

In addition, the steering control device 13, the driving force control device 14, and the braking force control device 15 are connected to the bus line 16. These control devices form a so-called ADAS (Advanced Driver Assistance System) that controls the behavior of the vehicle 30 by cooperating with each other based on various sensor information acquired by the sensor controller 12 and various sensor information acquired by the sensor controller 21.

The steering control device 13 controls a steering angle of the vehicle 30 based on an instruction from the ECU 11.

The driving force control device 14 controls the driving force of the vehicle 30 based on an instruction from the ECU 11. Specifically, the accelerator opening of the engine of the vehicle 30 is controlled based on an instruction from the ECU 11.

The braking force control device 15 controls the braking force of the vehicle 30 based on an instruction from the ECU 11. The steering control device 13, the driving force control device 14, and the braking force control device 15 cooperate with each other to enable automatic traveling of the vehicle 30.

Note that the ADAS mounted on the vehicle 30 is not limited to the above-described device, and other devices may be mounted.

The sensor controller 21 is connected to a surrounding camera 21*a*, a driver monitor camera 21*b*, a distance measuring sensor 21*c*, and the like, and passes these sensor outputs to the ECU 11. The ECU 11 senses the surrounding environment of the vehicle 30 and detects the biological signal of the driver based on the acquired information. Note that the sensors connected to the sensor controller 21 are not limited to these examples, and other sensors may be connected.

The surrounding camera 21*a* is installed in different directions around the vehicle 30 and acquires image information around the vehicle 30.

The driver monitor camera 21*b* is installed on an instrument panel of the vehicle 30 and acquires an image including the face of the driver who is driving. The driver monitor camera 21*b* may be installed at the foot of the driver to monitor the driver's accelerator operation or brake operation.

The distance measuring sensor 21*c* is installed in different directions around the vehicle 30 and measures a distance to an obstacle around the vehicle 30. The distance measuring sensor 21*c* is, for example, an ultrasonic sensor that measures a distance of a short distance, a millimeter wave radar that measures a distance of a medium or long distance, light detection and ranging (LiDAR), or the like.

The GPS receiver 22 acquires a GPS signal transmitted from a global positioning system (GPS) satellite, and performs positioning of a current position of the vehicle 30 and calculation of a traveling direction. In addition, the ECU 11 collates the current position and the traveling direction of the identified vehicle 30 with the map database 24 (map matching) to identify the road on which the vehicle 30 is traveling and the traveling direction. Note that a method for specifying a current position and a traveling direction of the vehicle using a GPS signal and a map database has been widely put into practical use in a car navigation system, and thus a detailed description thereof will be omitted.

The display device 25 displays information such as information related to a traveling state of the vehicle 30 and information presentation to the driver. The display device 25 is, for example, a center monitor 25*a*, an indicator 25*b*, a meter 25*c*, or the like illustrated in FIG. 4. The content of each display device 25 will be described later (refer to FIG. 4). Note that the display device 25 may be a device that presents information not only to the driver's visual sense but also to the driver's auditory sense or tactile sense, for example, a speaker or a vibration device.

The operation device 26 acquires various operation information for the vehicle 30. The operation device 26 is, for example, a touch panel stacked on a display surface of the center monitor 25*a*, a physical switch installed on an instrument panel, or the like.

The communication interface 27 connects the vehicle 30 and a mobile terminal (for example, a smartphone, a wearable terminal, or the like registered in advance) outside the vehicle by wireless communication. The communication interface 27 transmits, for example, the evaluation score E of the cognitive function level calculated by the driver assistance device 10 from the vehicle 30 to the mobile terminal.

Next, a schematic configuration of a cockpit of the vehicle 30 on which the driver assistance device 10 is mounted will be described with reference to FIG. 4.

The center monitor 25*a*, which is an example of the display device 25, is installed in the center cluster of the vehicle 30. The center monitor 25*a* is installed as high as possible in order to enhance visibility during traveling. The driver assistance device 10 displays the evaluation score E of the cognitive function level, the driving assistance content based on the evaluation score E, and the like on the center monitor 25*a*.

The indicator 25*b*, which is an example of the display device 25, is installed along an upper end of a spoke of a steering wheel 31. The indicator 25*b* is formed of, for example, a rod-shaped light guide, and emits light in a color corresponding to incident light incident from one end. The driver assistance device 10 causes the indicator 25*b* to emit light in a color corresponding to the driver assistance content based on the evaluation score E of the cognitive function level. The indicator 25*b* is installed in a peripheral vision region of the driver who is driving, and can recognize the emission color of the indicator 25*b* without directing the gaze to the indicator 25*b*. Thus, the driver can easily recognize the driver assist content.

The meter 25*c*, which is an example of the display device 25, is installed in a meter cluster of the vehicle 30. The meter 25*c* is, for example, a speedometer, an engine speed meter, a fuel meter, a water temperature meter, or the like.

Further, a driver monitor camera 21*b* is installed in the meter cluster of the vehicle 30. The driver monitor camera 21*b* is installed in the meter cluster so as to be able to image without omission a region (eye range) where eyeballs of the driver who is driving are present.

(Functional Configuration of Driver Assistance Device)

Figure 5:
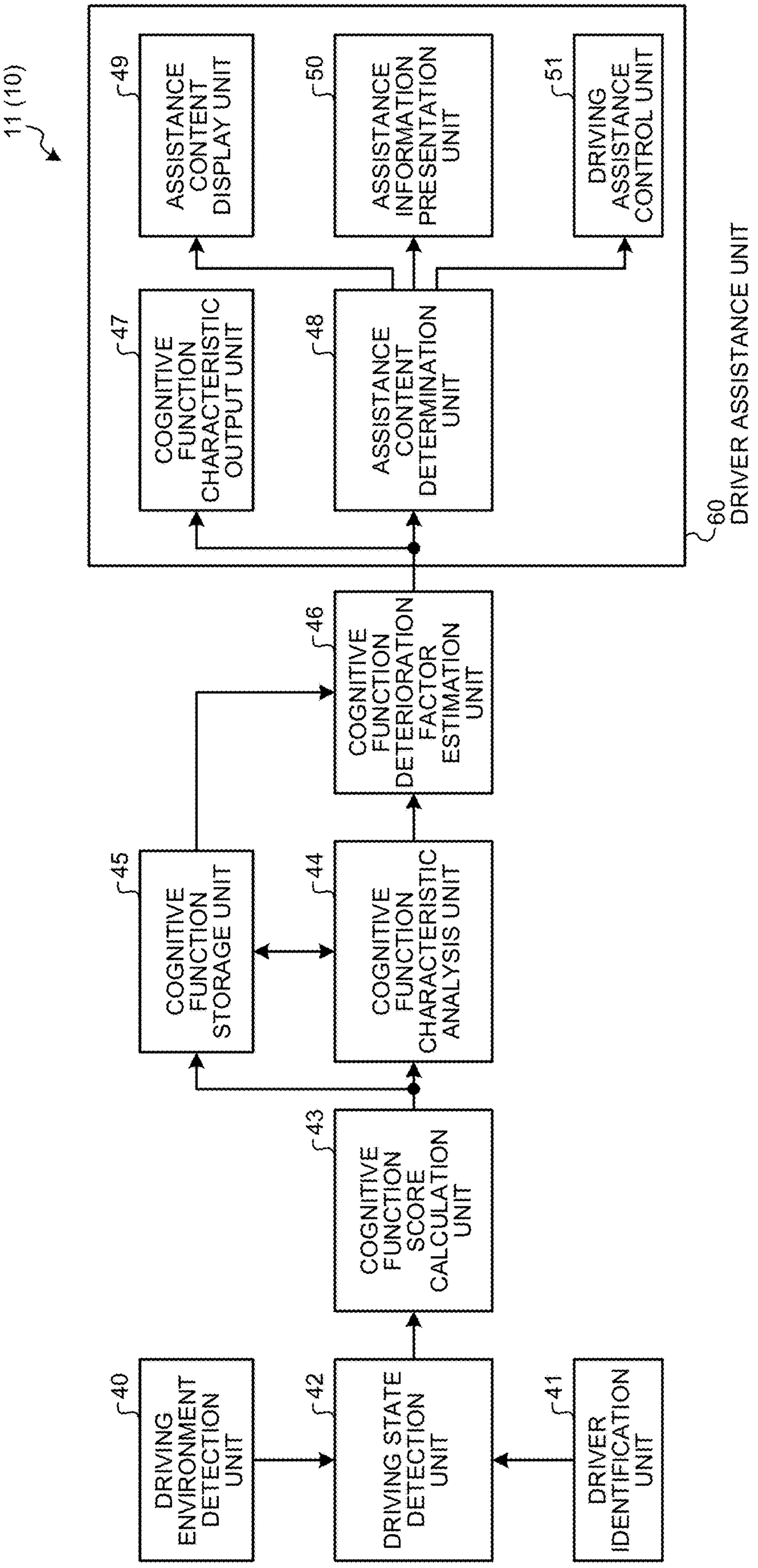
FIG. 5 is a functional block diagram illustrating an example of a functional configuration of the driver assistance device according to the embodiment.

A functional configuration of the driver assistance device 10 will be described with reference to FIG. 5. FIG. 5 is a functional block diagram illustrating an example of a functional configuration of the driver assistance device according to the embodiment.

The ECU 11 of the driver assistance device 10 develops the control program stored in the ECU 11 in the RAM 11*b* and causes the CPU 11*a* to operate, thereby realizing a driving environment detection unit 40, a driver identification unit 41, a driving state detection unit 42, a cognitive function score calculation unit 43, a cognitive function characteristic analysis unit 44, a cognitive function storage unit 45, a cognitive function deterioration factor estimation unit 46, and a driver assistance unit 60 illustrated in FIG. 5 as functional units. The driver assistance unit 60 includes a cognitive function characteristic output unit 47, an assistance content determination unit 48, an assistance content display unit 49, an assistance information presentation unit 50, and a driving assistance control unit 51 as functional units. The driver assistance device 10 may implement some or all of these functions by dedicated hardware.

The driving environment detection unit 40 detects a state of the surrounding environment of the road on which the vehicle 30 is traveling. The state of the surrounding environment of the road is, for example, information such as a road shape ahead in the traveling direction, the number of lanes, a speed limit, a distance to an intersection, a shape of an intersection, presence/absence and an inter-vehicle distance of a preceding vehicle, presence/absence and a presence position of an oncoming vehicle, presence/absence and a presence position of a pedestrian, and the like. These pieces of information can be obtained by, for example, analyzing an image captured by the surrounding camera 21*a* and information acquired by the distance measuring sensor 21*c*, and collating the current position of the vehicle 30 acquired from the GPS signal with the map database 24.

The driver identification unit 41 identifies a driver who is driving the vehicle 30. The driver identification unit 41 identifies the driver who is currently driving, for example, by collating the face image of the driver captured by the driver monitor camera 21*b* with the face image of the driver registered in advance. When the collation result cannot be obtained, it is determined that the driver is a new driver, and new registration is performed.

The driving state detection unit 42 detects at least one of a driving behavior of the vehicle 30 by the driver, biological information of the driver during driving, and a behavior of the vehicle 30.

Based on the information detected by the driving state detection unit 42, the cognitive function score calculation unit 43 calculates an evaluation score E indicating whether the cognitive function of the driver is high or low. Note that the evaluation score E is an example of a numerical value in the present disclosure.

The cognitive function characteristic analysis unit 44 analyzes the evaluation score E of the cognitive function level calculated by the cognitive function score calculation unit 43 as a cognitive function characteristic related to one or more different brain functions. Note that the cognitive function characteristics related to one or more different brain functions include, for example, the above-described memory ability 80, executive function ability 81, attention ability 82, information processing ability 83, and visual-spatial cognitive ability 84.

The cognitive function storage unit 45 stores the evaluation score E for the same driver calculated by the cognitive function score calculation unit 43 and the analysis result of the cognitive function characteristic analysis unit 44 in time series.

Based on the stored content of the cognitive function storage unit 45, the deterioration in the cognitive function deterioration factor estimation unit 46 calculates the degrees of influence of a plurality of variation factors that cause a deterioration in the cognitive function of the driver, and estimates a main factor. In addition, the cognitive function deterioration factor estimation unit 46 estimates the variation factor of the cognitive function by comparing the stored content corresponding to the present in the cognitive function storage unit 45 with the stored content corresponding to a predetermined past time point.

The driver assistance unit 60 assists the driver based on the estimation result by the cognitive function deterioration factor estimation unit 46 or information corresponding to the estimation result.

The cognitive function characteristic output unit 47 outputs information on an analysis result by the cognitive function characteristic analysis unit 44. In addition, the cognitive function characteristic output unit 47 outputs the estimation result by the cognitive function deterioration factor estimation unit 46. Note that the cognitive function characteristic output unit 47 is an example of an output unit in the present disclosure.

Based on the comparison between the cognitive function characteristic calculated by the cognitive function characteristic analysis unit 44 and the threshold, the assistance content determination unit 48 determines whether to enable a function of assisting information provision for suppressing further deterioration of the cognitive function characteristics of the driver or enable a function of assisting a driving operation associated with the deteriorated cognitive function characteristics from among a plurality of functions of the vehicle 30. In addition, the assistance content determination unit 48 determines the content of information to be presented to the driver according to the main factor of the cognitive function deterioration estimated by the cognitive function deterioration factor estimation unit 46.

The assistance content display unit 49 displays the information determined by the assistance content determination unit 48 on, for example, the center monitor 25*a*.

When the assistance content determination unit 48 determines to enable a function of assisting information provision for suppressing further deterioration of the cognitive function characteristics of the driver, the assistance information presentation unit 50 provides the information. Note that enabling the function of assisting information provision for suppressing further deterioration of the cognitive function characteristics of the driver will be referred to as a training mode in the following description.

When the assistance content determination unit 48 determines to enable the function of assisting the driving operation associated with the cognitive function characteristics, the driving assistance control unit 51 activates the function. Note that enabling the function of assisting the driving operation associated with the cognitive function characteristics will be referred to as a driving assistance mode in the following description.

(Actions of Driving State Detection Unit)

The actions of the driving state detection unit 42 will be described in detail with reference to FIG. 6. FIG. 6 is a diagram for explaining an example of information detected by a driving state detection unit. Examples of analysis of general driving behaviors are summarized in Nonpatent Literature 23, Nonpatent Literature 24, and the like. Examples of the information to be detected include the driving behavior of the driver, the behavior of the vehicle, and the biological information of the driver, and road shapes, weather, time zones, and the like are assumed as examples of the driving environment.

The driving state detection unit 42 detects biological information of the driver by analyzing an image including the face of the driver captured by the driver monitor camera 21*b* illustrated in FIG. 3. Specifically, a gaze direction, a face direction, a body movement (change in the position of the face), the number of blinks, an interval, and the like of the driver are detected. Note that the biological information to be detected and the detection method thereof are not limited to the above contents. For example, a heartbeat, a body temperature, a respiratory state, and the like of the driver may be detected. As a specific method for detecting the state of the driver, the vehicle information, the operation information, and the biological information, a method summarized in Nonpatent Literature 8 may be used, or another method may be used.

In addition, the driving state detection unit 42 detects the behavior of the vehicle 30 based on the outputs of the accelerator position sensor 12*a*, the brake pedal force sensor 12*b*, the steering angle sensor 12*c*, and the distance measuring sensor 21*c* illustrated in FIG. 3 and the outputs of various sensors (vehicle speed sensor, shift position sensor, and the like) included in the vehicle 30 and not illustrated in FIG. 3. Specifically, a behavior of the vehicle 30 such as a vehicle speed, an inter-vehicular distance, presence or absence of lane departure, sudden acceleration, sudden deceleration, and a driving trajectory is detected. As a method for measuring vehicle behaviors such as displacement of a vehicle position with respect to a road, displacement of a steering angle, and pedal reaction time, the method disclosed in Nonpatent Literature 9 may be used, or other methods may be used. The method for measuring the inter-vehicle distance can be realized by using information detected by a general ADAS in addition to the method disclosed in Nonpatent Literature 10. The behavior of the vehicle 30 to be detected is not limited to the above contents.

In addition, the driving state detection unit 42 detects the driving behavior of the driver based on the detected biological information of the driver, the behavior of the vehicle 30, and the road environment in which the vehicle 30 is traveling. Specifically, the driving behaviors such as a distribution state of gaze points, presence or absence of visual distracted driving, presence or absence of left and right confirmation, presence or absence of rear confirmation, presence or absence of temporary stop, compliance with a traffic sign, compliance with a signal, and continuous driving time are detected. The driving behavior of the driver to be detected is not limited to the above contents.

The distribution state of the gaze points can be obtained by analyzing the measured gaze direction. Note that the gaze points are points at which the gaze direction stays for a predetermined time or more. When the gaze points are distributed in a wide range, it is estimated that the driver pays attention to a wide range. On the other hand, when the gaze points are concentrated in a narrow range, it is estimated that attention of the driver is attracted to a specific range. As a method for detecting where the gaze is directed, for example, a method disclosed in Nonpatent Literature 11 or Nonpatent Literature 12 may be used, or another method may be used.

The presence or absence of visual distracted driving can be obtained by analyzing the measured gaze direction and face direction. As a method for detecting the presence or absence of visual distracted driving, for example, a method disclosed in Nonpatent Literature 12 may be used, or other methods may be used.

The presence or absence of the left and right confirmation can be confirmed by determining whether the face direction has moved left and right or whether the gaze is directed in the direction to be safely confirmed at the place where the left and right confirmation is to be performed. Note that it is possible to specify that the vehicle is traveling in front of the intersection where the left and right confirmation is required, for example, by collating the current position of the vehicle 30 acquired from the GPS signal with the map database 24 as the place where the left and right confirmation is to be performed. In addition, for example, by using the technology disclosed in Nonpatent Literature 12, whether a pedestrian is confirmed may be detected, or other methods may be used.

The presence or absence of the rear confirmation can be confirmed by determining whether the face is directed rearward or in the direction of a rearview mirror at a place where the rear confirmation is to be performed. The presence or absence of the rear confirmation may be confirmed by using, for example, the technology disclosed in Nonpatent Literature 12, or other methods may be used. Note that the place where the rear confirmation is to be performed can be estimated, for example, by the shift position of the vehicle 30 entering the reverse position.

The presence or absence of the temporary stop can be confirmed by determining whether the vehicle 30 has stopped at a place where the temporary stop is to be performed. Note that the place where the temporary stop is to be performed can be specified by the surrounding camera 21*a* detecting the traffic sign of the temporary stop. As a method of traffic sign recognition, for example, a method disclosed in Nonpatent Literature 13 may be used, or another method may be used.

The compliance with the traffic sign can be determined based on whether the content of the traffic sign detected by the surrounding camera 21*a* and the detected behavior of the vehicle 30 are consistent with each other.

The compliance with the signal can be determined based on whether the state of the signal detected by the surrounding camera 21*a* and the detected behavior of the vehicle 30 are consistent with each other.

The continuous driving time can be specified by, for example, an elapsed time after the ignition is turned on.

Since the driving environment of the vehicle 30 constantly changes, it is not desirable to continue detecting the detection target because the load on the computer increases. Therefore, based on the driving environment of the vehicle 30, the driving state detection unit 42 detects at least one of the driving behaviors of the vehicle 30 by the driver, the biological information of the driver during driving, and the behavior of the vehicle 30, which are predicted to occur in the driving environment.

Specifically, the driving state detection unit 42 estimates biological information expected to occur in the driving environment, the behaviors of the vehicle 30, and the driving behavior based on the driving environment detected by the driving environment detection unit 40, and narrows down detection targets by detecting at least only the estimated information.

In FIG. 6, a horizontal axis represents an example of the driving environment detected by the driving environment detection unit 40, and a vertical axis represents each detection target described above. Circles in FIG. 6 indicate detection targets to be detected in the detected driving environment.

For example, when it is detected that the vehicle 30 is traveling in front of the intersection, the driving state detection unit 42 detects information regarding the behavior of the driver expected to occur at the intersection. For example, a gaze direction and a face direction are detected as biological information. In addition, as the behavior of the vehicle 30, a vehicle speed, sudden acceleration, sudden deceleration, and a driving trajectory are detected. Then, as the driving behavior of the driver, a distribution state of gaze points, presence or absence of left and right confirmation, presence or absence of a temporary stop, compliance with a traffic sign, and compliance with a signal are detected. Note that the circles in FIG. 6 indicate an example, and the present invention is not limited to this example.

Since the calculation load increases when the detection target is estimated every time corresponding to the driving environment, for example, the map of FIG. 6 may be stored in the storage device 11*d*, and the driving state detection unit 42 may select the detection target with reference to the map.

(Method for Calculating Cognitive Function)

Figure 7:
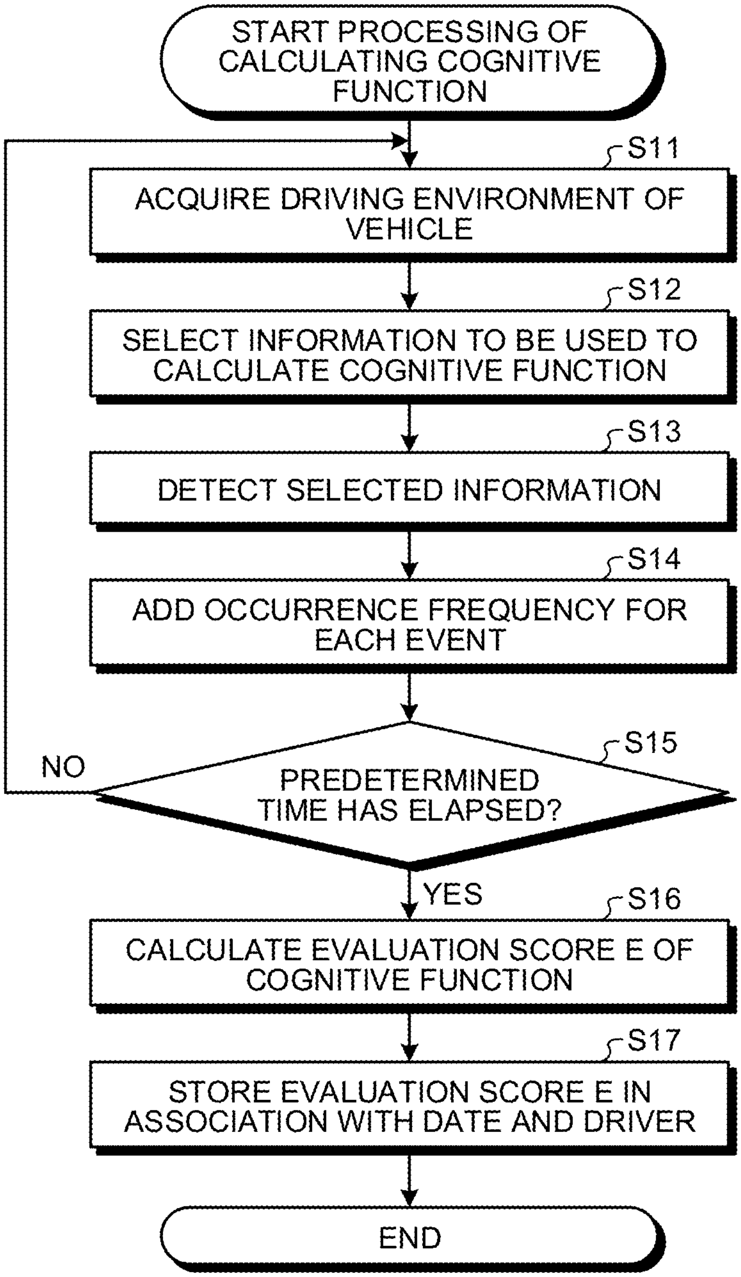
FIG. 7 is a flowchart illustrating an example of a flow of processing in which a cognitive function score calculation unit calculates an evaluation score of a cognitive function level.

A method in which the cognitive function score calculation unit 43 calculates the evaluation score E of the cognitive function level will be described with reference to FIG. 7. FIG. 7 is a flowchart illustrating an example of a flow of processing in which a cognitive function score calculation unit calculates an evaluation score of a cognitive function level.

The driving environment detection unit 40 detects a driving environment of the vehicle 30 (step S11).

Based on the driving environment detected by the driving environment detection unit 40, the driving state detection unit 42 selects information to be detected in order to calculate the cognitive function (step S12).

The driving state detection unit 42 detects the information selected in step S12 (step S13).

Based on the information detected by the driving state detection unit 42, the cognitive function score calculation unit 43 adds the occurrence frequency of the event for each event suitable for the driving environment detected by the driving environment detection unit 40 (step S14).

The cognitive function score calculation unit 43 determines whether a predetermined time has elapsed (step S15). When it is determined that the predetermined time has elapsed (step S15: Yes), the process proceeds to step S16. On the other hand, when it is not determined that the predetermined time has elapsed (step S15: No), the process returns to step S11. The predetermined time may be optionally set, but for example, the determination is performed in units of one minute.

When it is determined in step S15 that the predetermined time has elapsed, the cognitive function score calculation unit 43 calculates an evaluation score E of the cognitive function level (step S16). Note that, for example, the occurrence frequency for each event calculated in step S14 is set as the evaluation score E. Note that, for example, since the distribution state of the gaze points cannot be expressed by frequency, a numerical value representing the width of the distribution range may be set as the evaluation score E. In addition, for other information that cannot be expressed by frequency, the evaluation score E may be calculated based on a calculation method set for each information.

The cognitive function storage unit 45 stores the evaluation score E in association with the date and the driver (step S17). Thereafter, the cognitive function score calculation unit 43 ends the processing of FIG. 7.

The cognitive function storage unit 45 stores the evaluation score E calculated in step S16 in the storage device 11*d* (refer to FIG. 3) in association with the date and the driver (step S17). Thereafter, the cognitive function score calculation unit 43 ends the processing of FIG. 7.

Note that, although the occurrence frequency of the event is added in step S14, the accumulated occurrence frequency of the event may be subtracted in a case where it is detected that the desired driving behavior has been performed.

(Analysis of Cognitive Function)

A method for analyzing the evaluation score E of the cognitive function level performed by the cognitive function characteristic analysis unit 44 will be described with reference to FIG. 8. FIG. 8 is a diagram for explaining a relationship between cognitive function characteristics related to different brain functions and driving behaviors generated during driving.

As illustrated in FIG. 8, the cognitive function characteristic analysis unit 44 analyzes the degree of deterioration for each cognitive function related to different brain functions based on the type of the detected driving behavior and its occurrence frequency. The influence on driving due to deterioration of each cognitive function is disclosed in Nonpatent Literature 2, Nonpatent Literature 5, Nonpatent Literature 6, and Nonpatent Literature 7. Furthermore, the influence of the decrease in the information processing speed is disclosed in Nonpatent Literature 14 and Nonpatent Literature 15. Note that the driving behavior illustrated in FIG. 8 is an example, and a correspondence table different from this may be used.

For example, when the memory ability 80 deteriorated, it becomes difficult to hold information described on a traffic sign, the user forgets where to go and gets lost (Nonpatent Literature 5), or the user forgets past experience such as hitting a car or having trouble (Nonpatent Literature 6). There are cases where a traffic sign or a traffic law cannot be recognized (Nonpatent Literature 2). The cognitive function characteristic analysis unit 44 calculates an evaluation score Ea of the memory ability 80 from the evaluation scores E calculated by the cognitive function score calculation unit 43 based on, for example, the frequency of observed traffic signs and the frequency of observed signals. As a method of traffic sign recognition, for example, a method disclosed in Nonpatent Literature 13 may be used, or another method may be employed. In addition, it may be determined that the content of the traffic sign has been recognized based on whether the driver has taken a driving behavior corresponding to the content of the traffic sign.

When the executive function ability 81 decreases, an erroneous operation of the accelerator and the brake occurs, or a plurality of pieces of information processing become difficult (Nonpatent Literature 5). In addition, it is difficult to determine the behavior to be taken next when the vehicle cannot pass through the planned route (Nonpatent Literature 6), or it is difficult to take a flexible response corresponding to the situation (Nonpatent Literature 2). In some cases, the operation of the car navigation cannot be performed (Nonpatent Literature 6). The cognitive function characteristic analysis unit 44 calculates an evaluation score Eb of the executive function ability 81 from the evaluation scores E calculated by the cognitive function score calculation unit 43 based on, for example, the occurrence frequency of sudden acceleration and sudden deceleration.

When the attention ability 82 decreases, attention cannot be paid to the surrounding environment such as a traffic sign or a signal (Nonpatent Literature 5). A signal is missed or a person does not notice coming out (Nonpatent Literature 6). In addition, when a lane change is made, attention to the surroundings cannot be allocated, resulting in dangerous operation, or when a vehicle turns right or left, the driver does not notice a pedestrian or a motorcycle (Nonpatent Literature 5). When the attention is distracted, the attention is distracted by an event in the vehicle or outside the vehicle (Nonpatent Literature 14), which causes visual distracted driving. The cognitive function characteristic analysis unit 44 calculates an evaluation score Ec of the attention ability 82 from the evaluation scores E calculated by the cognitive function score calculation unit 43 based on, for example, the distribution state of gaze points, the frequency of observed traffic signs, the frequency of observed signals, and the like. As a method for detecting where the gaze is directed, for example, a method disclosed in Nonpatent Literature 11 or Nonpatent Literature 12 may be used, and it is possible to evaluate whether a notable point such as a traffic sign or a pedestrian is looked at from the movement. In addition, the evaluation score E calculated for each of whether the safety confirmation of the surroundings is insufficient and whether the traffic sign or the like is overlooked in the driving behavior example illustrated in FIG. 8 may be weighted to calculate the evaluation score Ec of the attention ability 82. As the weighting coefficient, a predetermined coefficient may be used, or the correlation with the cognitive function may be sequentially learned.

When the information processing ability 83 deteriorated, it takes time to find danger on a congested road or a road where the flow of vehicles is fast, and a response is delayed (Nonpatent Literature 15). In addition, slow driving, hesitating driving, and unexpected operation errors increase (Nonpatent Literature 14). The cognitive function characteristic analysis unit 44 calculates an evaluation score Ed of the information processing ability 83 from the evaluation scores E calculated by the cognitive function score calculation unit 43 based on, for example, the reaction time of the brake, which is the driving operation. For example, the brake timing is evaluated and calculated using the method of Nonpatent Literature 16.

When the visual-spatial cognitive ability 84 deteriorated, a sense of distance to a preceding vehicle deviates, or a lane protrudes at the time of a curve (Nonpatent Literature 5). In addition, it is difficult to grasp the relationship between the size of the own vehicle and the object (Nonpatent Literature 7). The cognitive function characteristic analysis unit 44 calculates an evaluation score Ee of the visual-spatial cognitive ability 84 from the evaluation scores E calculated by the cognitive function score calculation unit 43 based on, for example, the average value of the inter-vehicle distances, the number of times of lane departure, and the like. For example, the method of Nonpatent Literature 9 is used to measure the vehicle behavior such as the displacement of the vehicle position, the displacement of the steering angle, and the pedal reaction time with respect to the road. As a method for measuring the inter-vehicle distance, there is a method of Nonpatent Literature 10, and the inter-vehicle distance may be calculated using information detected by a general ADAS.

Note that it is efficient to calculate the evaluation scores Ea, Eb, Ec, Ed, and Ee of each cognitive function level based on, for example, a table indicating a relationship between a detection result of a driving state created in advance and the evaluation scores Ea, Eb, Ec, Ed, and Ee.

The cognitive function characteristic analysis unit 44 evaluates the degree of each cognitive function of the driver by comparing the evaluation scores Ea, Eb, Ec, Ed, and Ee calculated in this manner with the first threshold Th1 and the second threshold Th2 described above.

When the evaluation scores Ea, Eb, Ec, Ed, and Ee are larger than the first threshold Th1, the driver assistance device 10 of the present embodiment determines that the cognitive function of the driver is in a normal state, that is, in a safe state. In addition, when the evaluation scores Ea, Eb, Ec, Ed, and Ee are smaller than the first threshold Th1 and larger than the second threshold Th2 smaller than the first threshold Th1, the driver assistance device 10 determines that the corresponding cognitive function is a caution-needed state requiring attention to driving. Further, when the evaluation scores Ea, Eb, Ec, Ed, and Ee are smaller than the second threshold Th2, the driver assistance device 10 determines that the corresponding cognitive function is in a dangerous state in which continuation of safe driving is difficult.

Note that the cognitive function characteristic analysis unit 44 may analyze only the cognitive function currently calculated by the cognitive function score calculation unit 43, or may analyze the cognitive function including the past cognitive function stored in association with the driver by the cognitive function storage unit 45. By performing the analysis including the past cognitive function, it is possible to estimate whether the cognitive function tends to recover or decrease. Then, the training mode may be caused to actively function for the cognitive function that tends to recover. In addition, in a case where a long-term lowering tendency of the cognitive function is observed, the training mode may be caused to function in order to prevent further lowering.

In addition, depending on the driving environment of the vehicle 30, the events to be analyzed by the cognitive function score calculation unit 43 and the cognitive function characteristic analysis unit 44 may not constantly occur. Therefore, not all the evaluation scores Ea, Eb, Ec, Ed, and Ee regarding all the cognitive functions to be targeted can be obtained simultaneously.

(Method for Determining Assistance Content Corresponding to Evaluation Score of Cognitive Function Level)

A method for determining the assistance content performed by the driver assistance device 10 according to the cognitive function characteristics will be described with reference to FIGS. 9 and 10. FIG. 9 is a first diagram for explaining an example of assistance contents performed by the driver assistance device according to the cognitive function characteristics. FIG. 10 is a second diagram for explaining an example of assistance contents performed by the driver assistance device according to the cognitive function characteristics.

As illustrated in FIG. 9, when the driver is in a state requiring attention to driving (caution level), the assistance content determination unit 48 assists information provision for suppressing further deterioration of the cognitive function of the driver. That is, driving assistance (training mode) by information provision is caused to function. This is because, since the cognitive function of the driver is not completely deteriorated, there is a possibility that the deteriorated cognitive function can be recovered to a normal level by continuing driving while performing training related to the corresponding cognitive function. For example, when the cognitive function is temporarily deteriorated, it is expected to recover the cognitive function while receiving driving assistance. In addition, in a case of a condition called mild cognitive impairment (MCI) which is a chronic cognitive function deterioration and is a previous stage of dementia, there is a possibility that cognitive function can be recovered by such training. With this training mode, it can be expected that safe driving is continued by recovering the cognitive function necessary for driving the vehicle.

In addition, as illustrated in FIG. 9, when the cognitive function of the driver is at a dangerous level, the assistance content determination unit 48 operates a function of assisting the corresponding cognitive function among the driving assistance functions of the vehicle 30. That is, the driving assistance (driving assistance mode) by the driving assistance function is activated.

Since the driver assistance device 10 evaluates the states of the plurality of cognitive function characteristics, there is a possibility that the plurality of cognitive functions are determined to be the caution level. In such a case, the assistance content determination unit 48 determines for which cognitive function the training mode is enabled and for which cognitive function the driving assistance mode is enabled. Note that the assistance content determination unit 48 enables the training mode only for any one of the cognitive functions. This is because, when the training mode for the plurality of cognitive functions is simultaneously operated, more information is presented, which may cause driver's confusion. Then, the assistance content determination unit 48 causes a driving assistance mode to function, which assists a cognitive function other than the cognitive function that has caused the training mode to function, among the plurality of cognitive functions determined that the cognitive function is at the caution level. When it is determined that the plurality of cognitive functions are at the danger level, the assistance content determination unit 48 causes the driving assistance modes related to the plurality of corresponding cognitive functions to function.

Next, specific contents of the training mode and the driving assistance mode related to each cognitive function will be described with reference to FIG. 10.

When the memory ability 80 deteriorates to the caution level, the assistance content determination unit 48 operates, as the training mode, for example, a function of recognizing the content of a traffic sign and outputting a message notifying the content, a function of performing detailed route guidance, and the like. As a result, it is possible to assist recovery of the memory ability 80 of the driver estimated to be decreased. In addition, when the memory ability 80 deteriorates to the danger level, the assistance content determination unit 48 operates, for example, a traffic sign recognition function included in the vehicle 30. Furthermore, the upper limit speed of the vehicle 30 may be set based on the content of the recognized traffic sign, for example, the speed limit. This makes it possible to reduce inadvertent errors due to carelessness.

When the executive function ability 81 deteriorates to the caution level, the assistance content determination unit 48 operates, for example, a function of outputting a message recommending early braking as the training mode. As a result, it is possible to assist recovery of the executive function ability 81 of the driver estimated to be lowered. In addition, when the executive function ability 81 deteriorates to the danger level, the assistance content determination unit 48 operates, for example, a rear-end collision warning function, an inter-vehicle distance holding function, or a sudden unintended acceleration prevention function included in the vehicle 30. As a result, it is possible to assist execution of a part of the driving operation of the driver.

When the attention ability 82 deteriorates to the caution level, the assistance content determination unit 48 operates, as the training mode, for example, a function of outputting guidance related to a driving environment or guidance related to a driving behavior. As a result, it is possible to assist recovery of the attention ability 82 of the driver estimated to be lowered. In addition, when the attention ability 82 deteriorates to the danger level, the assistance content determination unit 48 operates, for example, a pedestrian detection function, an inter-vehicle distance holding function, and the like included in the vehicle 30. As a result, it is possible to cause the vehicle 30 to substitute for a part of the region to which the driver should pay attention.

When the information processing ability 83 deteriorates to the caution level, the assistance content determination unit 48 operates, as the training mode, for example, a function of lowering the speed of the automobile to urge the driver to have enough time to pay attention to a pedestrian or the like, a function of outputting a message for prompting a break, or the like. This assists recovery of the information processing ability 83 of the driver estimated to have decreased. In addition, when the information processing ability 83 deteriorates to the danger level, the assistance content determination unit 48 operates, for example, an inter-vehicle distance holding function, a collision warning, and the like included in the vehicle 30. As a result, it is possible to cause the vehicle 30 to perform a part of the information processing to be performed by the driver.

When the visual-spatial cognitive ability 84 deteriorates to the caution level, the assistance content determination unit 48 operates, for example, a function of outputting guidance regarding the driving environment as the training mode. This assists recovery of the visual-spatial cognitive ability 84 of the driver estimated to have decreased. In addition, when the visual-spatial cognitive ability 84 deteriorates to a dangerous level, the assistance content determination unit 48 operates an inter-vehicle distance holding function, a lane departure prevention function, a parking assist function, or the like included in the vehicle 30. As a result, it is possible to cause the vehicle 30 to perform a part of the visual-spatial recognition to be performed by the driver.

Note that the driver assistance device 10 continuously executes the calculation of the cognitive function even when various assistance modes are functioning. Then, in a case where the cognitive function is recovered to a normal level, the operation of the functioning assistance mode is stopped.

(Temporal Change in Cognitive Function)

Figure 11:
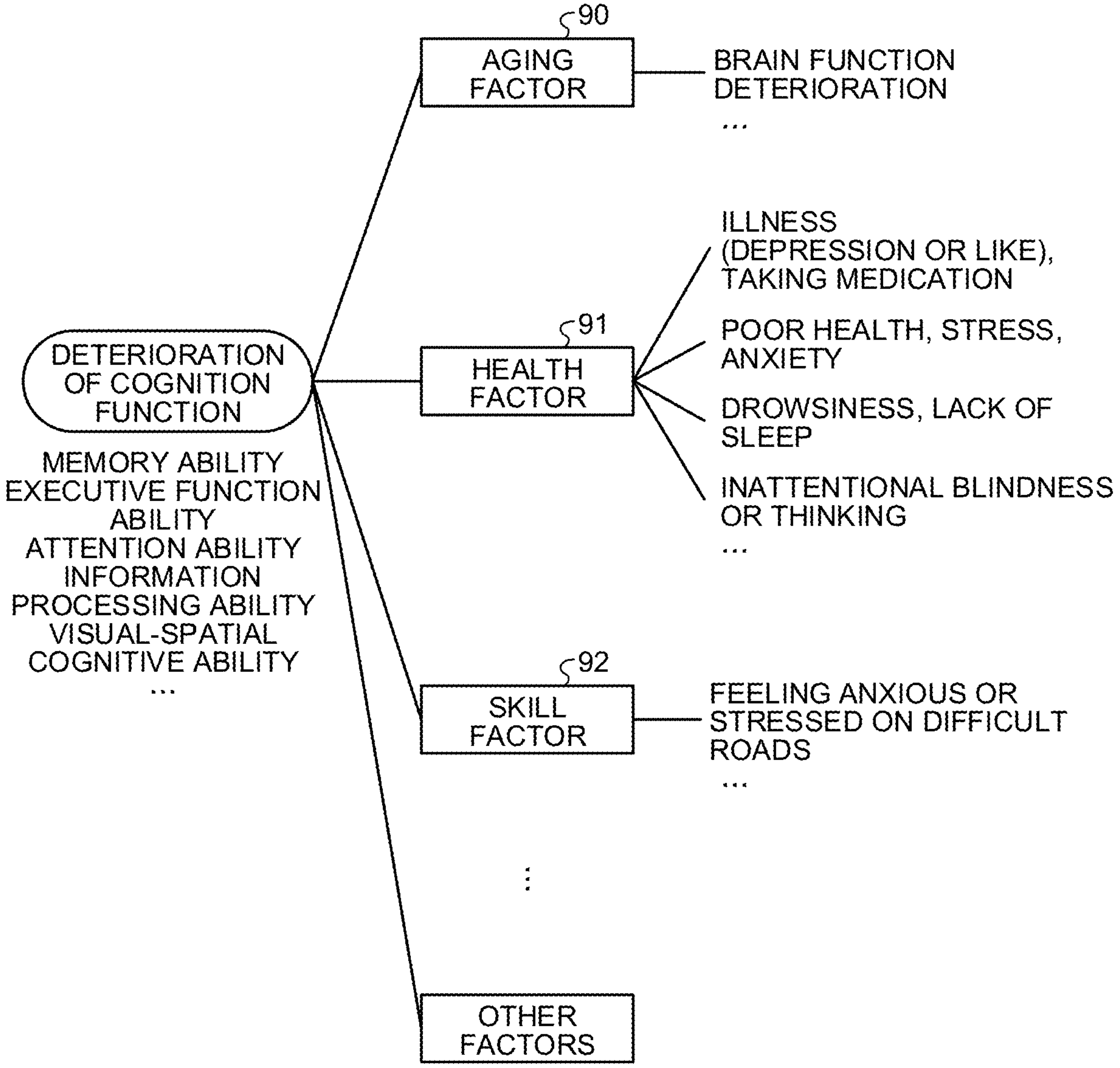
FIG. 11 is a diagram for explaining an example of a factor that deteriorates the cognitive function.
Figure 12:
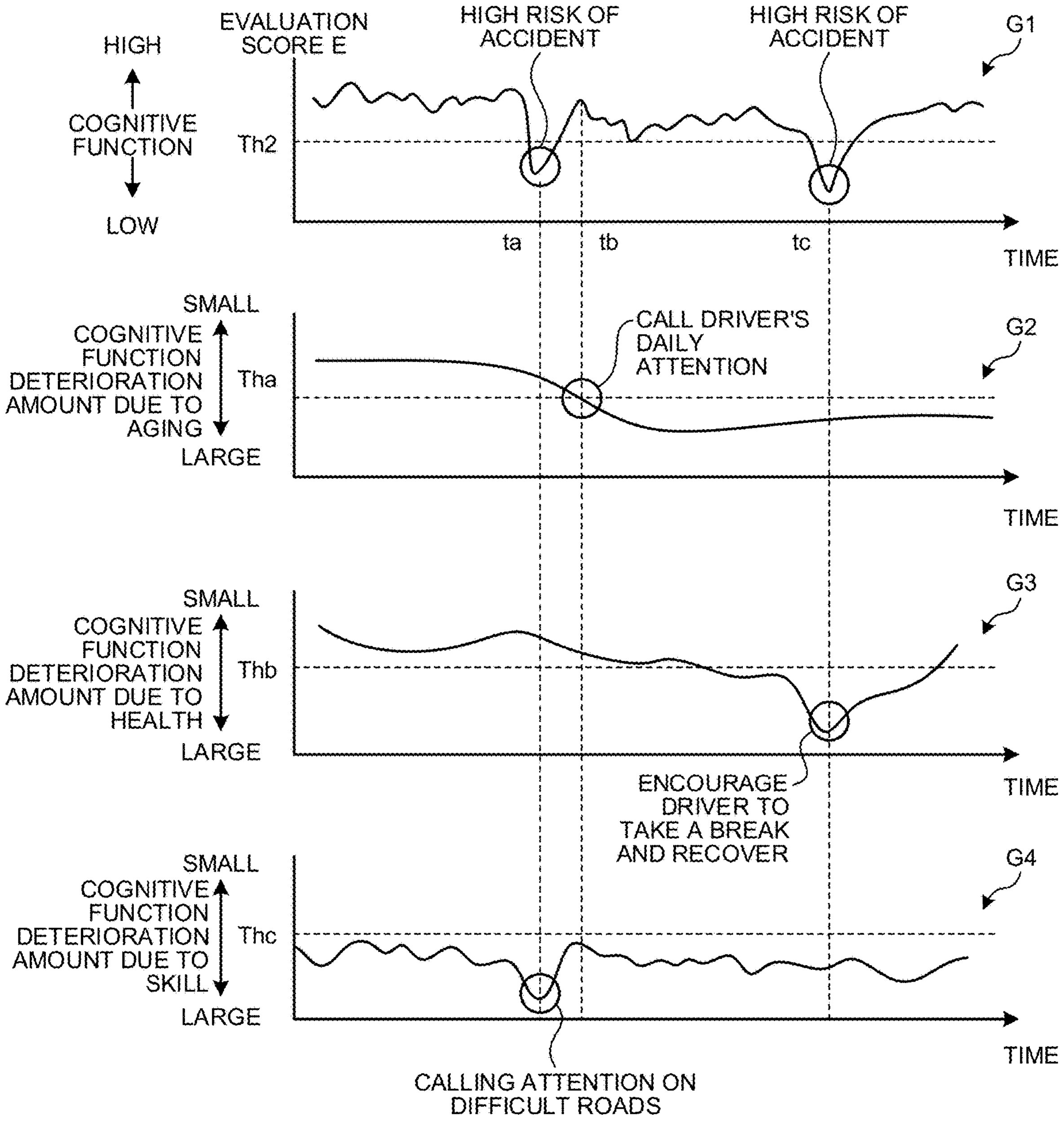
FIG. 12 is a diagram illustrating an example of a temporal change in the cognitive function.

The temporal change of the cognitive function will be described with reference to FIGS. 11 and 12. FIG. 11 is a diagram for explaining an example of a factor that deteriorates the cognitive function. FIG. 12 is a diagram illustrating an example of a time-series change in the cognitive function.

The cognitive function of the driver is not always constant and changes due to various factors. For example, the change is caused by an aging factor 90, a health factor 91, a skill factor 92, and the like illustrated in FIG. 11.

The aging factor 90 is a factor associated with aging of the driver among factors that change the cognitive function. As the driver gets older, his brain function deteriorates. This may cause a reduction in the cognitive function. In general, since the deterioration in the body function related to the aging factor 90 progresses over a very long time, it can be estimated that the deterioration in the cognitive function due to the aging factor 90 progresses, for example, by comparing the current cognitive function with the cognitive function several months or years ago.

The health factor 91 is a factor associated with the health of the driver among factors that change the cognitive function. When fatigue remains, the attention function and the execution function are likely to be affected (Nonpatent Literature 18). In addition, this corresponds to a case where a range of attention is narrowed due to fatigue, a memory ability is attenuated (Nonpatent Literature 19), or it becomes difficult to maintain attention with concentration due to drowsiness (Nonpatent Literature 19). Specific examples of the health factor 91 include a factor related to a disease such as depression or a mental disorder, a factor related to a health such as poor health, stress, or drowsiness, and a factor related to a mental activity such as inattentional blindness or thinking. Since the change in the cognitive function caused by the health factor 91 often varies at intervals of one week or several days, it can be estimated that the deterioration in the cognitive function due to the health factor 91 occurs by monitoring the change in the cognitive function in a relatively short period of time.

The skill factor 92 is a factor associated with the driving skill of the driver among factors that change the cognitive function. In a road environment where there is a lot of information to be processed, such as a case where a driving beginner tends to gaze at an important area for predicting a risk longer than a skilled person (Nonpatent Literature 20), there is a possibility that information processing ability and attention ability will deteriorate. The occurrence of the change in the cognitive function associated with the skill factor 92 can be estimated, for example, by observing a specific driving behavior (for example, driving behavior at the time of turning right or left at an intersection, driving behavior at the time of overtaking, and driving behavior at the time of parking in a garage). In addition, the cognitive function related to the skill factor 92 also changes depending on the driving environment (for example, road environment, weather, and time (day and night)).

Note that the cognitive function of the driver does not vary depending on any one of the aging factor 90, the health factor 91, and the skill factor 92, but varies depending on a combination of a plurality of factors. In addition, there are factors other than those shown here. For example, when the driving environment becomes high temperature, the cognitive function varies due to various factors such as the environment affecting the cognitive function such as the head becoming blurred (Nonpatent Literature 21). The driver assistance device 10 of the present embodiment estimates a main factor therein. In addition, the variation factor of the cognitive function of the driver can be considered in addition to these, but in the driver assistance device 10 of the present embodiment, the variation of the cognitive function of the driver is caused by the aging factor 90, the health factor 91, and the skill factor 92. Here, three factors are selected as factors, but factors not described herein may be evaluated. In addition, the cognitive function deterioration factor may be decomposed in another way. Furthermore, only one factor of interest may be focused, or any combination of two or more factors may be focused.

Next, how the cognitive function of the driver varies will be qualitatively described with reference to FIG. 12. A graph G1 in FIG. 12 is a graph illustrating an example of a time-series change in the evaluation score E of the cognitive function level of a certain driver. From the graph G1, the evaluation score E decreases near a time ta and near a time tc, and falls below the second threshold Th2. That is, it can be read that the risk of an accident increases near the time ta and near the time tc.

In addition, a graph G2 is an example in which the amount of deterioration in the cognitive function due to aging of the same driver is plotted on the same time axis as the graph G1. In addition, a graph G3 is an example in which the amount of deterioration in the cognitive function due to the health of the same driver is plotted on the same time axis as the graph G1. In addition, a graph G4 is an example in which the amount of deterioration in the cognitive function due to the skill of the same driver is plotted on the same time axis as the graph G1.

The vertical axis of the graph G2 indicates the amount of deterioration in the cognitive function due to aging, and indicates that the amount of deterioration in the cognitive function due to aging increases as it goes downward in the vertical axis direction. According to the graph G2, it can be seen that the amount of deterioration of the cognitive function due to aging of the driver exceeds a threshold Tha affecting safe driving after a time tb. In such a case, it is desirable to call the driver's daily attention after the time tb.

The vertical axis of the graph G3 indicates the amount of deterioration of the cognitive function due to the health, and the downward in the vertical axis direction indicates that the amount of deterioration of the cognitive function due to the health increases. According to the graph G3, it can be seen that the amount of deterioration of the cognitive function due to the health of the driver exceeds a threshold Thb affecting the safe driving and becomes maximum near the time tc. Then, when the graph G3 and the graph G1 are compared, it can be seen that the deterioration in the cognitive function near the time tc is mainly caused by a health factor. In such a case, it is desirable to prompt the driver to take a break and recover near time tc.

The vertical axis of the graph G4 indicates the amount of deterioration of the cognitive function due to the skill, and the downward in the vertical axis direction indicates that the amount of deterioration of the cognitive function due to the skill increases. According to the graph G4, it can be seen that the amount of deterioration of the cognitive function due to the driving skill of the driver exceeds a threshold Thc affecting the safe driving at the time displayed on the graph G4. There is a high possibility that the road environment of the section displayed in the graph G4 is a road environment that the driver is not good at. Further, it can be seen that the amount of deterioration of the cognitive function due to the skill of the driver exceeds a threshold Thc affecting the safe driving and becomes maximum near the time ta. Then, when the graph G4 and the graph G1 are compared, it can be seen that the deterioration in the cognitive function near the time ta is mainly caused by a skill factor. In such a case, it is desirable to call attention to a difficult road near the time ta.

In this manner, the driver assistance device 10 of the present embodiment estimates whether the main factor of the deterioration in the cognitive function is due to the aging, health, or skill. Then, appropriate information presentation and driving assistance are performed according to the main factor of the deterioration of the cognitive function, and recovery of the cognitive function is promoted.

(Estimation of Main Factor of Cognitive Function Deterioration)

Figure 13A:
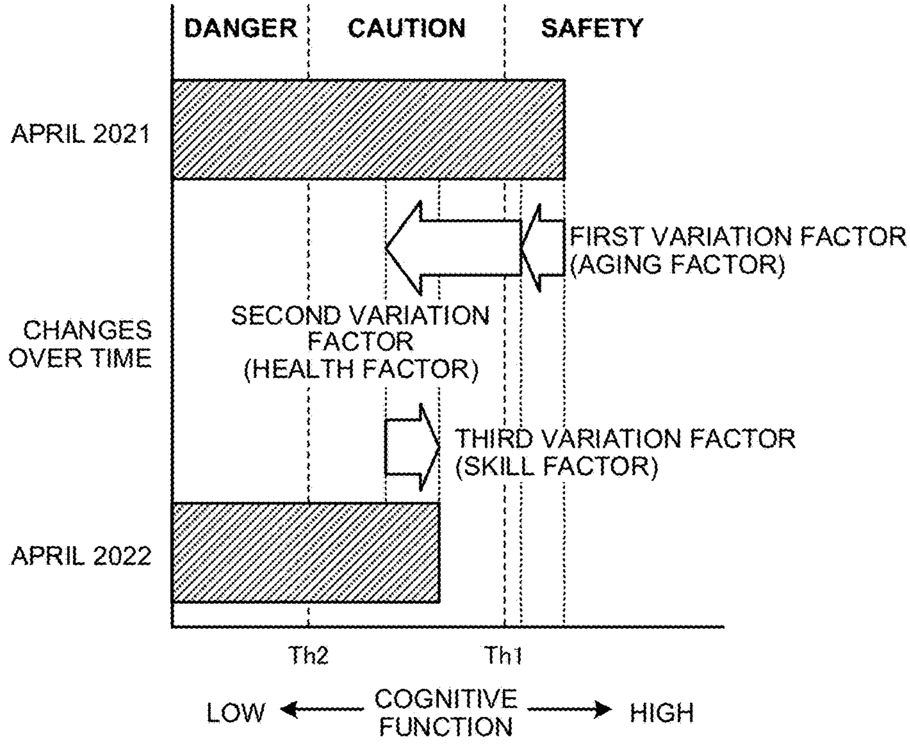
FIG. 13A is a first diagram illustrating an example of factor analysis of the cognitive function deterioration.
Figure 13B:
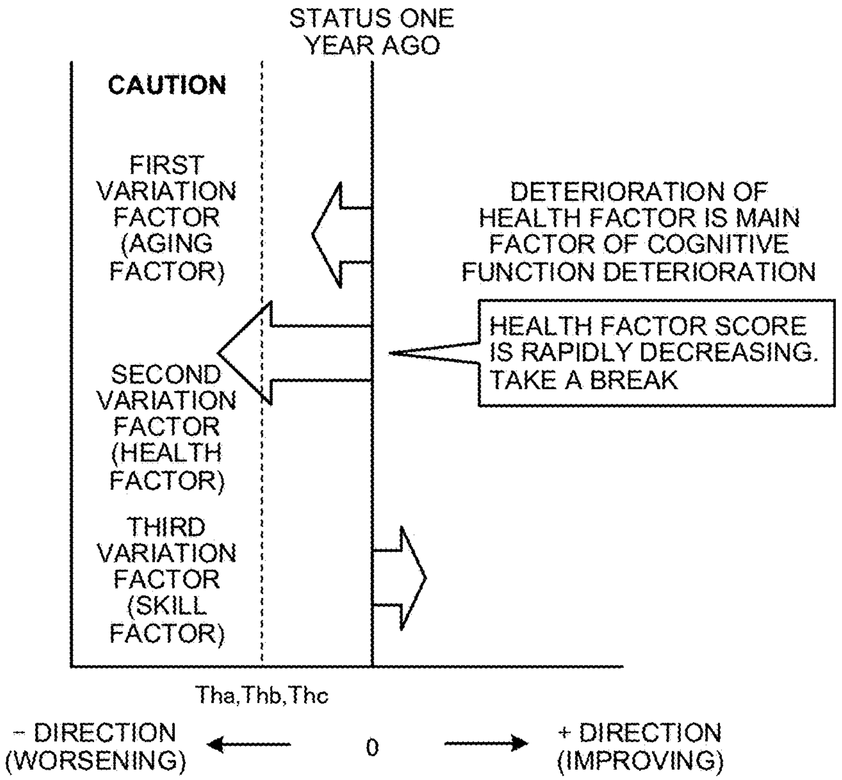
FIG. 13B is a second diagram illustrating an example of factor analysis of the cognitive function deterioration.

The factor analysis of the cognitive function deterioration will be described with reference to FIGS. 13A and 13B. FIG. 13A is a first diagram illustrating an example of factor analysis of the cognitive function deterioration. FIG. 13B is a second diagram illustrating an example of factor analysis of the cognitive function deterioration.

As described in FIG. 12, the cognitive function of the driver constantly changes with time. FIG. 13A illustrates an example in which the cognitive function at present (April 2022) is compared with the cognitive function one year ago (April 2021). FIG. 13A illustrates that the evaluation score E of the cognitive function level was a safe level above the first threshold Th1 one year ago, but is now between the first threshold Th1 and the second threshold Th2, that is, the caution level.

When the evaluation score E of the cognitive function level of the driver decreases as described above, the cognitive function deterioration factor estimation unit 46 of the driver assistance device 10 according to the present embodiment estimates whether the main factor is an aging factor (first variation factor), a health factor (second variation factor), or a skill factor (third variation factor).

FIG. 13B illustrates an example in which factor analysis of the cognitive function deterioration is performed. The cognitive function deterioration factor estimation unit 46 compares the evaluation value of the cognitive function related to the aging factor of one year ago with the current evaluation value of the cognitive function related to the aging factor. As a result, it is determined that the cognitive function related to the aging factor is deteriorated compared to one year ago. That is, as indicated by a leftward arrow in FIG. 13B, it is determined that the cognitive function related to the aging factor (first variation factor) has deteriorated.

In addition, the cognitive function deterioration factor estimation unit 46 compares the evaluation value of the cognitive function related to the health factor one year ago with the evaluation value of the cognitive function related to the current health factor. As a result, it is determined that the cognitive function related to the health factor greatly deteriorates as compared with one year ago and exceeds the threshold Thb that affects safe driving. That is, as indicated by a leftward long arrow in FIG. 13B, it is determined that the cognitive function related to the health factor (second variation factor) has been greatly deteriorated.

In addition, the cognitive function deterioration factor estimation unit 46 compares the evaluation value of the cognitive function related to the skill factor one year ago with the evaluation value of the cognitive function related to the current skill factor. As a result, it is determined that the cognitive function related to the skill factor is improved compared to one year ago. That is, as indicated by a short rightward arrow in FIG. 13B, it is determined that the cognitive function related to the skill factor (third variation factor) has improved. Note that, in FIG. 13B, the threshold Tha, the threshold Thb, and the threshold Thc are denoted at the same position for convenience, but these thresholds actually have different values.

Based on the result of FIG. 13B, the cognitive function deterioration factor estimation unit 46 estimates that the main factor of the deterioration in the cognitive function is the health factor with the longest leftward arrow. Then, the assistance content determination unit 48 determines to present information related to the main factor of the cognitive function deterioration, such as "The health factor score is rapidly decreasing. Take a break.". The assistance content display unit 49 displays the information on the center monitor 25*a*, for example, to urge the driver to change his/her behavior corresponding to the main factor of the cognitive function deterioration.

When the estimation result of FIG. 13B is superimposed on FIG. 13A and the current cognitive function and the cognitive function one year ago are compared, it can be seen that the cognitive function related to the aging factor and the health factor deteriorates and the skill factor improves. Then, it can be seen that the amount of deterioration of the cognitive function due to the health factor is larger than the amount of deterioration of the cognitive function due to the aging factor. Note that, here, an example in which the current cognitive function and the cognitive function one year ago are compared is illustrated, but the past timing to be compared is not limited to one year ago.

(Identification of Variation State of Cognitive Function)

Figure 14:
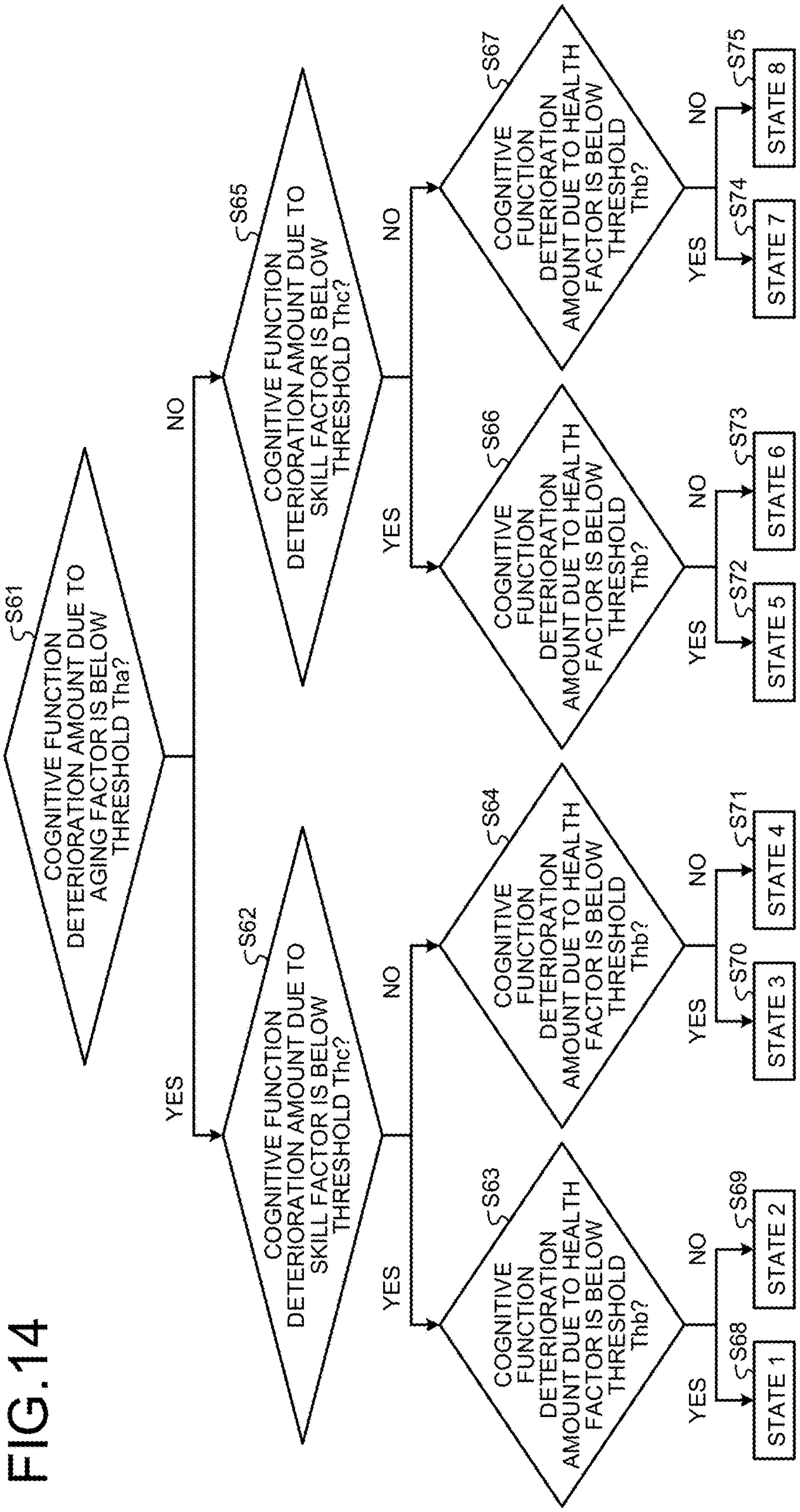
FIG. 14 is a diagram illustrating an example of a method for identifying a state in which the cognitive function has deteriorated.

A method for identifying the variation state of the cognitive function of the driver will be described with reference to FIG. 14. FIG. 14 is a diagram illustrating an example of a method for identifying a state in which the cognitive function has deteriorated. Note that FIG. 14 illustrates a flow of identification processing of the variation state of the cognitive function of the driver performed by the cognitive function deterioration factor estimation unit 46 of the driver assistance device 10 of the present embodiment. Here, it is assumed that the variation factors of the cognitive function are three factors of an aging factor, a health factor, and a skill factor.

The cognitive function deterioration factor estimation unit 46 determines whether the cognitive function deterioration amount due to the aging factor is below the threshold Tha (step S61). When it is determined that the cognitive function deterioration amount due to the aging factor is below the threshold Tha (step S61: Yes), the process proceeds to step S62. On the other hand, when it is not determined that the cognitive function deterioration amount due to the aging factor is below the threshold Tha (step S61: No), the process proceeds to step S65.

When it is determined in step S61 that the cognitive function deterioration amount due to the aging factor is below the threshold Tha, the cognitive function deterioration factor estimation unit 46 determines whether the cognitive function deterioration amount due to the skill factor is below the threshold Thc (step S62). When it is determined that the cognitive function deterioration amount due to the skill factor is below the threshold Thc (step S62: Yes), the process proceeds to step S63. On the other hand, when it is not determined that the cognitive function deterioration amount due to the skill factor is below the threshold Thc (step S62: No), the process proceeds to step S64.

When it is determined in step S62 that the cognitive function deterioration amount due to the skill factor is below the threshold Thc, the cognitive function deterioration factor estimation unit 46 determines whether the cognitive function deterioration amount due to a health factor is below the threshold Thb (step S63). When it is determined that the cognitive function deterioration amount due to the health factor is below the threshold Thb (step S63: Yes), the cognitive function deterioration factor estimation unit 46 determines that the cognitive function of the driver is normal (state 1) (step S68). On the other hand, when it is not determined that the cognitive function deterioration amount due to the health factor is below the threshold Thb (step S63: No), the cognitive function deterioration factor estimation unit 46 determines that the cognitive function of the driver has deteriorated due to the health factor (state 2) (step S69).

When it is not determined in step S62 that the cognitive function deterioration amount due to the skill factor is below the threshold Thc, the cognitive function deterioration factor estimation unit 46 determines whether the cognitive function deterioration amount due to the health factor is below the threshold Thb (step S64). When it is determined that the cognitive function deterioration amount due to the health factor is below the threshold Thb (step S64: Yes), the cognitive function deterioration factor estimation unit 46 determines that the cognitive function of the driver has deteriorated due to the skill factor (state 3) (step S70). On the other hand, when it is not determined that the cognitive function deterioration amount due to the health factor is below the threshold Thb (step S64: No), the cognitive function deterioration factor estimation unit 46 determines that the cognitive function of the driver has deteriorated due to the health factor and skill factor (state 4) (step S71).

When it is not determined in step S61 that the cognitive function deterioration amount due to the aging factor is below the threshold Tha, the cognitive function deterioration factor estimation unit 46 determines whether the cognitive function deterioration amount due to the skill factor is below the threshold Thc (step S65). When it is determined that the cognitive function deterioration amount due to the skill factor is below the threshold Thc (step S65: Yes), the process proceeds to step S66. On the other hand, when it is not determined that the cognitive function deterioration amount due to the skill factor is below the threshold Thc (step S65: No), the process proceeds to step S67.

When it is determined in step S65 that the cognitive function deterioration amount due to the skill factor is below the threshold Thc, the cognitive function deterioration factor estimation unit 46 determines whether the cognitive function deterioration amount due to the health factor is below the threshold Thb (step S66). When it is determined that the cognitive function deterioration amount due to the health factor is below the threshold Thb (step S66: Yes), the cognitive function deterioration factor estimation unit 46 determines that the cognitive function of the driver has deteriorated due to the aging factor (state 5) (step S72). On the other hand, when it is not determined that the cognitive function deterioration amount due to the health factor is below the threshold Thb (step S66: No), the cognitive function deterioration factor estimation unit 46 determines that the cognitive function of the driver has deteriorated due to the aging factor and health factor (state 6) (step S73).

When it is not determined in step S65 that the cognitive function deterioration amount due to the skill factor is below the threshold Thc, the cognitive function deterioration factor estimation unit 46 determines whether the cognitive function deterioration amount due to the health factor is below the threshold Thb (step S67). When it is determined that the cognitive function deterioration amount due to the health factor is below the threshold Thb (step S67: Yes), the cognitive function deterioration factor estimation unit 46 determines that the cognitive function of the driver has deteriorated due to the aging factor and skill factor (state 7) (step S74). On the other hand, when it is not determined that the cognitive function deterioration amount due to the health factor is below the threshold Thb (step S67: No), the cognitive function deterioration factor estimation unit 46 determines that the cognitive function of the driver has deteriorated due to the aging factor, skill factor, and health factor (state 8) (step S75).

(State Transition of Cognitive Function Level)

An example of state transition of the cognitive function level of the driver will be described with reference to FIG. 15. FIG. 15 is a diagram illustrating an example of a temporal change in a cognitive function level of a driver.

The driver assistance device 10 of the present embodiment monitors the variation in the cognitive function of the driver in time series. As a result, a transition diagram illustrating a variation state of the cognitive function as illustrated in FIG. 15 is generated. The vertical axis in FIG. 15 indicates the state of the cognitive function before the variation. States 1 to 8 described in FIG. 14 are plotted on the vertical axis. The horizontal axis in FIG. 15 indicates the state of the cognitive function after the variation. Also on the horizontal axis, states 1 to 8 described in FIG. 14 are plotted.

Since the state of the cognitive function of the driver varies with time, the driver assistance device 10 observes a transition from a state m (m=1 to 8) before 1:00 to a state n (n=1 to 8) after 1:00. When it is found that the state has shifted from the state m to the state n, the state of the change in the variation factor of the cognitive function at that time is specified. The content described in each item of FIG. 15 illustrates how the variation factor of the cognitive function changes. For convenience, lower case letters of identifiers ((a) to (c)) are attached to portions where the variation factor has deteriorated, and upper case letters of identifiers ((A) to (C)) are attached to portions where the variation factor has improved.

For example, when the state before 1:00 is the state 2 and the current state is the state 7, the driver assistance device 10 determines that the aging factor and the skill factor among the variation factors of the cognitive function of the driver have deteriorated. In addition, the driver assistance device 10 determines that the health factor among the variation factors of the cognitive function of the driver has improved.

The driver assistance device 10 presents information to the driver corresponding to the variation state of the cognitive function illustrated in FIG. 15, thereby urging the driver to change his or her behavior particularly when the cognitive function deteriorates.

(Information Presentation Corresponding to Variation in Cognitive Function)

With reference to FIG. 16, a description will be given of a presentation example of information corresponding to the variation in the cognitive function of the driver. FIG. 16 is a diagram illustrating an example of information presentation contents corresponding to a variation in the cognitive function level.

As illustrated in FIG. 16, the driver assistance device 10 corresponding to the present embodiment presents at least information corresponding to the current state m (m=1 to 8) to the driver. At that time, the driver assistance device 10 presents information related to a main factor in which the cognitive function has deteriorated, and what point should be noted when driving. Although not illustrated in FIG. 16, it is desirable that the driver assistance device 10 present information corresponding to the state of the past cognitive function level and the state of the current cognitive function level. For example, in a case where the improvement in the cognitive function is observed, it is desirable to transmit the effect of the behavior change of the driver by presenting information regarding the variation factor that has caused the improvement. In addition, when the state in which the cognitive function is deteriorated continues, the driver assistance device 10 desirably gives further attention or recommends the operation of the driving assistance function.

(Information Presentation Example (Aging Factor))

An example of information presentation to the driver in a case where the aging factor is the main factor will be described with reference to FIG. 17. FIG. 17 is a diagram illustrating an example of information to be presented to a driver when a main factor of the cognitive function deterioration is an aging factor.

When the main factor of the cognitive function deterioration is the aging factor, the driver assistance device 10 presents to the driver that the cognitive function deterioration due to the aging is observed. Then, the driver is prompted to perform recovery training. Thereafter, after the end of driving, the driver is notified of a change in deterioration of the cognitive function due to the aging factor, that is, daily improvement. Note that, in a case where the deterioration of the cognitive function due to the aging factor is improved and the improved state continues for several days or more, for example, the information presentation regarding the aging factor is stopped.

Specifically, as illustrated in FIG. 17, in a case where a state in which the deterioration of the cognitive function due to the aging factor is not observed continues (state transition A in FIG. 17), information presentation regarding the aging factor is not performed.

In a case where the cognitive function deteriorates from a good state to a state affecting driving due to the aging factor (state transition B in FIG. 17), information such as “The aging factor score decreases. Recommend recovery training.” is presented. This causes the driver to recognize that the cognitive function has deteriorated due to the aging.

In a case where the deterioration in the cognitive function due to the aging factor is improved (state transition C in FIG. 17), information such as “Aging factor score improved. It seems that there was an effect of recovery training.” is presented. This allows the driver to recognize that the cognitive function has been improved.

When the deterioration in the cognitive function due to the aging factor continues (state transition D in FIG. 17), information such as “The aging factor score continues to decrease. Continue recovery training.” is presented. This causes the driver to recognize that the deterioration in the cognitive function due to the aging factor is not improved.

Note that the driver can be determined to have a dementia risk by continuously monitoring a decrease in the cognitive function due to the aging factor. Therefore, in a case where the deterioration in the cognitive function continues due to the aging factor, it may be notified that there is a risk of dementia, in addition to the presentation of various types of information illustrated in FIG. 17.

(Information Presentation Example (Health Factor))

An example of information presentation to the driver in a case where the health factor is the main factor will be described with reference to FIG. 18. FIG. 18 is a diagram illustrating an example of information to be presented to a driver when a main factor of the cognitive function deterioration is a health factor.

When the main factor of the cognitive function deterioration is a health factor, the driver assistance device 10 presents a message for making the driver realize that the driver is in a poor health and that there is an influence on driving by the poor health. In addition, as necessary, a break or driving attention is attracted.

Specifically, as illustrated in FIG. 18, in a case where a state in which the deterioration of the cognitive function due to the health factor is not observed continues (state transition E in FIG. 18), information presentation regarding the health factor is not performed.

When the cognitive function deteriorates from a good state to a state affecting driving (state transition F in FIG. 18) due to a health factor, information such as “The health factor score has decreased. Drive more carefully than usual.” is presented. This allows the driver to recognize that the health has been deteriorated.

In a case where the deterioration in the cognitive function due to the health factor is improved (state transition G in FIG. 18), information such as “The health factor score improved. Please continue safe driving.” is presented. This allows the driver to recognize that the cognitive function has been improved.

In a case where the deterioration in the cognitive function due to the health factor continues (state transition H in FIG. 18), information such as “The health factor score is decreased, which affects safe driving. A break is recommended.” is presented. This causes the driver to recognize that the deterioration in the cognitive function due to the health factor is not improved.

(Information Presentation Example (Skill Factor))

An example of information presentation to the driver in a case where the skill factor is the main factor will be described with reference to FIG. 19. FIG. 19 is a diagram illustrating an example of information to be presented to a driver when a main factor of the cognitive function deterioration is a skill factor.

When the main factor of the cognitive function deterioration is the skill factor, the driver assistance device 10 presents a message for making the driver aware of the influence on driving.

Specifically, as illustrated in FIG. 19, in a case where a state in which the deterioration of the cognitive function due to the skill factor is not observed continues (state transition I in FIG. 19), information presentation regarding the skill factor is not performed.

In a case where the cognitive function deteriorates from a good state to a state affecting driving due to the skill factor (state transition J in FIG. 19), information such as “Driving skill is deteriorating. Drive carefully without overconfidence.” is presented. This causes the driver to recognize that the driving skill has deteriorated. In addition, attention is attracted so as not to overestimate one’s own driving skill.

In a case where the deterioration in the cognitive function due to the skill factor is improved (state transition K in FIG. 19), information such as “Driving skill has been improved. Continue to drive safely.” is presented. This allows the driver to recognize that the cognitive function has been improved.

In a case where the deterioration in the cognitive function due to the skill factor continues (state transition L in FIG. 19), information such as “Driving skill has deteriorated. For safe driving, pay attention.” is presented. This causes the driver to recognize that the deterioration in the cognitive function due to the skill factor is not improved.

Note that, in a case where a difficult driving environment (turn right at intersection, travel in city, parking action, and the like) is known based on the analysis result of the driver's past cognitive function, information indicating that the road is a difficult road may be presented in advance. Furthermore, implementation of assistance by driving assistance may be proposed while traveling on a road that is not good at. Furthermore, at the start of driving, information on a destination may be obtained from the driver, and a proposal for a route change avoiding a difficult road may be made. Note that the information presentation regarding the skill factor to the driver may be performed before, during, or after the start of driving.

For example, when there is a road environment requiring assistance on the route before the start of driving, information such as "In particular, be careful when turning right." may be presented.

Further, when there is a road environment that requires assistance during driving, information such as "There is a joint ahead. Activate merging assistance?" may be presented.

After the end of the operation, information such as "Please be careful when turning right at the XX intersection." and "In recent years, the cognitive function at the time of traveling at an intersection tends to deteriorate, so please be careful." may be presented by summarizing the current operation.

Note that the skill factor varies over a long period of time in accordance with the driving proficiency level of the driver in addition to a short-term variation in accordance with the road environment in which the driver is traveling at that time. Therefore, in the state transition illustrated in FIG. 19, the evaluation value regarding the driving skill when the driver is young (around when the driver's license is acquired) may be compared with the evaluation value regarding the current driving skill.

(Method for Calculating Factor of Cognitive Function Deterioration (Aging Factor))

Figure 20:
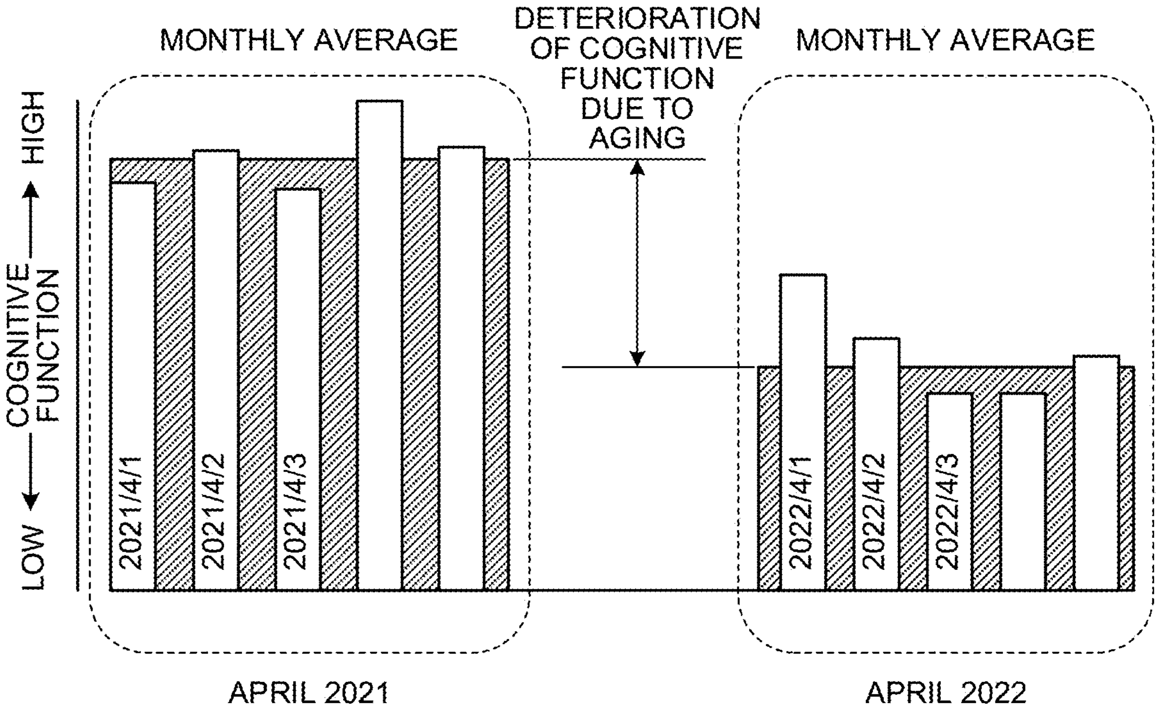
FIG. 20 is a diagram illustrating an example of a method for calculating the degree of influence of the aging factor on the deterioration in the cognitive function.

A method for calculating the influence of the aging factor on the deterioration in the cognitive function will be described with reference to FIG. 20. FIG. 20 is a diagram illustrating an example of a method for calculating the degree of influence of the aging factor on the deterioration in the cognitive function.

The cognitive function deterioration factor estimation unit 46 of the driver assistance device 10 calculates evaluation values regarding the aging factor, health factor, and skill factor, which are variation factors of the cognitive function, by different independent methods. As the evaluation value related to the aging factor, for example, the variation in the cognitive function due to the aging factor is calculated by comparing the change in the cognitive function for one month one year ago of the same driver with the variation in the cognitive function for the most recent one month.

Specifically, as illustrated in FIG. 20, a variation in the cognitive function at present (for example, April 2022) is compared with the variation in the cognitive function one year ago (for example, April 2021). The variation of the cognitive function in a month is calculated, for example, by averaging the daily evaluation results of the cognitive function in the month. Since the evaluation value of the cognitive function cannot be obtained on the day when the vehicle is not driven, the evaluation value of the cognitive function on the day when the vehicle is driven may be averaged by the number of days when the vehicle is driven.

The example illustrated in FIG. 20 indicates that the average value of the current cognitive function has decreased compared to that one year ago. As described above, the cognitive function deterioration factor estimation unit 46 of the driver assistance device 10 performs the evaluation on the assumption that the variation in the cognitive function over a long period of time is caused by the aging factor.

(Method for Calculating Factor of Cognitive Function Deterioration (Health Factor))

The cognitive function deterioration factor estimation unit 46 of the driver assistance device 10 calculates an evaluation value related to a health factor based on the number of blinks of the driver, the movement of the gaze of the driver, the body temperature of the driver, or the like measured by the driver monitor camera 21*b* mounted on the vehicle 30. Furthermore, the evaluation may be performed based on an output of a sensor (not illustrated) that measures, for example, an electrocardiogram or a pulse wave installed on the steering of the vehicle 30 (Nonpatent Literature 17).

The cognitive function score calculation unit 43 calculates an evaluation score E of the cognitive function level of the driver from the information obtained by these various sensors. Then, the cognitive function deterioration factor estimation unit 46 determines that the variation in the evaluation score E of the cognitive function level calculated in this way is due to the health factor of the driver.

(Method for Calculating Factor of Cognitive Function Deterioration (Skill Factor))

The cognitive function deterioration factor estimation unit 46 of the driver assistance device 10 calculates the evaluation value related to the skill factor based on the behavior of the vehicle 30 appearing as a result of the driving operation.

For example, it is possible to calculate an evaluation value regarding a skill factor of the driver based on a difference amount between an average or preferable operation pattern and an operation pattern actually performed by the driver for the basic operation (straight travel, curve travel, brake operation, and the like) of the driving behavior.

More specifically, since the road environment in which the vehicle 30 is traveling can be recognized by the car navigation device and the surrounding camera included in the vehicle 30, the evaluation value regarding the driving skill can be calculated for each traffic environment (when traveling straight, when changing lanes, when turning right or left, when parking, and the like).

(Another Calculation Method of Factors of Cognitive Function Deterioration)

Figure 21:
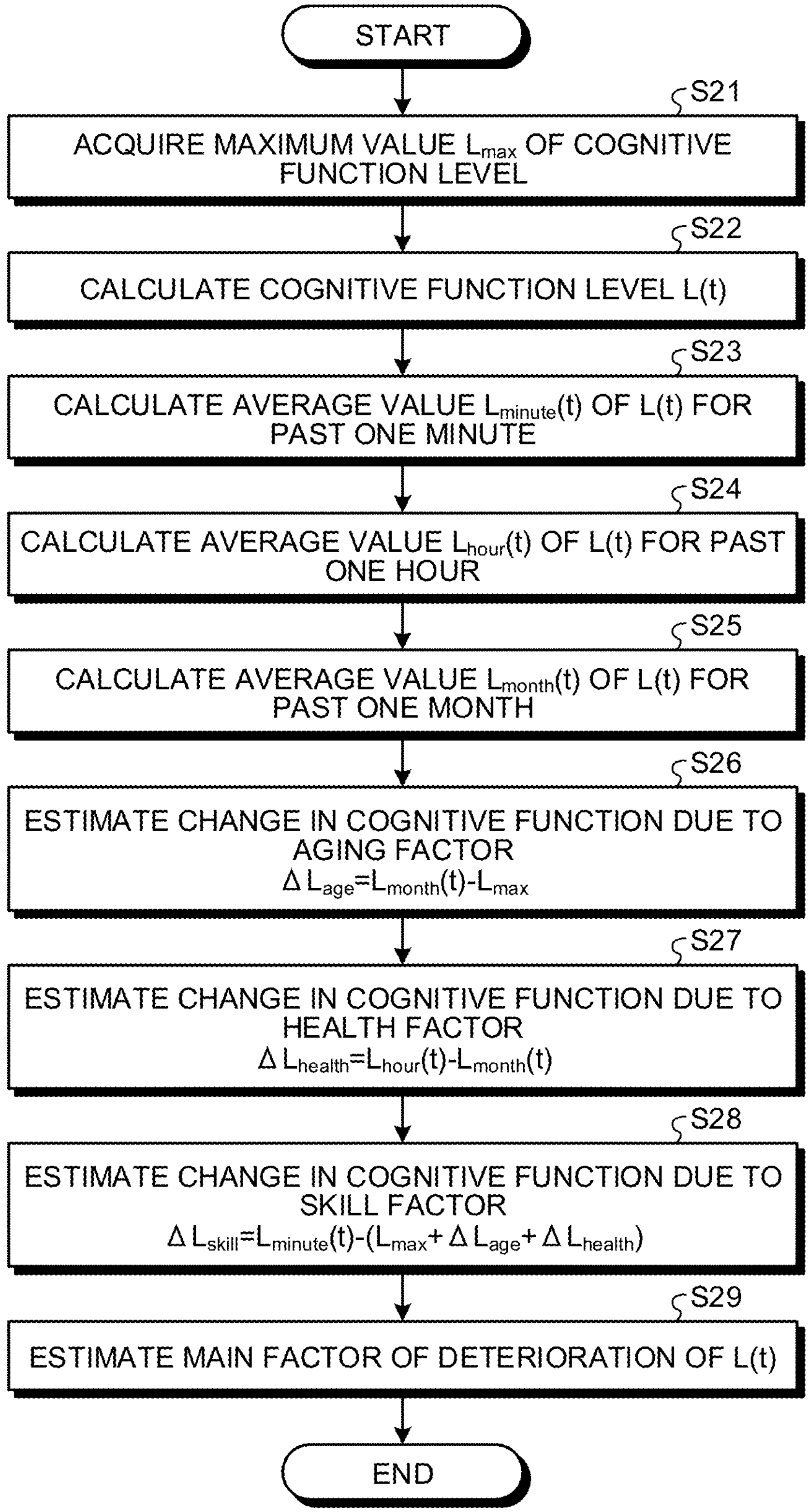
FIG. 21 is a flowchart illustrating an example of another method for performing factor estimation of deterioration in the cognitive function.

With reference to FIG. 21, another method for calculating the factors of the deterioration in the cognitive function will be described. FIG. 21 is a flowchart illustrating an example of another method for performing factor estimation of deterioration in the cognitive function.

The cognitive function deterioration factor estimation unit 46 of the driver assistance device 10 calculates evaluation values regarding the aging factor, health factor, and skill factor, which are variation factors of the cognitive function, by a method different from the above-described method. Specifically, when comparing the aging factor, the health factor, and the skill factor, which are factors that deteriorates the cognitive function, it is considered that the aging factor gradually affects over a long period of time (for example, in units of years). In addition, it is considered that the health factor is affected in a shorter period (for example, on a monthly basis, on a weekly basis) than the aging factor. Then, it is considered that the skill factor has an influence depending on the road environment in which the vehicle is traveling at that time. Therefore, by setting the period for taking the average of the evaluation values regarding the cognitive function to the period corresponding to each factor, the degree of influence of each factor on the cognitive function can be easily quantified.

More specifically, a maximum value Lmax of the cognitive function level of the driver and a cognitive function level L (t) at each time t are acquired. The cognitive function level L (t) is equivalent to the evaluation score E of the cognitive function level described above. The cognitive function deterioration factor estimation unit 46 calculates an average value Lminute (t) (third average value) of the acquired cognitive function level L (t) for the past one minute (third predetermined period), an average value Lhour (t) (second average value) for the past one hour (second predetermined period), and an average value Lmonth (t) (first average value) for the past one month (first predetermined period). Then, the cognitive function deterioration factor estimation unit 46 estimates a difference value between the maximum value Lmax of the cognitive function level and an average value Lmonth (t) of the cognitive function level for the past one month as a variation amount ΔLage of the cognitive function due to the aging factor. In addition, the cognitive function deterioration factor estimation unit 46 estimates a difference value between the average value Lhour (t) of the cognitive function level for the past one hour and an average value Lmonth (t) of the cognitive function level for the past one month as a variation amount ΔLhealth of the cognitive function due to the health factor. Furthermore, the cognitive function deterioration factor estimation unit 46 estimates a difference value between the cognitive function level L (t) at the time t, the maximum value Lmax of the cognitive function level, the variation amount in the cognitive function due to the aging factor, and the sum of the variation amount ΔLage in the cognitive function due to the aging factor and the variation amount ΔLhealth in the cognitive function due to the health factors as the variation amount ΔLskill in the cognitive function due to the skill factor.

Hereinafter, a flow of processing for estimating a factor of deterioration in the cognitive function will be described with reference to the flowchart of FIG. 21.

The cognitive function deterioration factor estimation unit 46 acquires the maximum value Lmax of the cognitive function level of the driver (step S21). Specifically, the cognitive function deterioration factor estimation unit 46 acquires the maximum value of the cognitive function level L (t) of the corresponding driver stored in the cognitive function storage unit 45.

The cognitive function score calculation unit 43 calculates a cognitive function level L (t) at time t (step S22).

The cognitive function deterioration factor estimation unit 46 calculates an average value Lminute (t) of the cognitive function level L (t) for the past one minute (step S23).

The cognitive function deterioration factor estimation unit 46 calculates an average value Lhour (t) of the cognitive function level L (t) for the past one hour (step S24).

The cognitive function deterioration factor estimation unit 46 calculates an average value Lmonth (t) of the cognitive function level L (t) for the past one month (step S25).

The cognitive function deterioration factor estimation unit 46 estimates a change in the cognitive function due to the aging factor (step S26). Specifically, the cognitive function deterioration factor estimation unit 46 estimates the variation amount ΔLage of the cognitive function due to the aging factor by Formula (1). Although not described in the flowchart, the estimated variation ΔLage of the cognitive function due to the aging factor is stored in the cognitive function storage unit 45 in association with the information specifying the driver.

$$\Delta Lage = Lmonth(t) - L\max \tag{1}$$

The cognitive function deterioration factor estimation unit 46 estimates a change in the cognitive function due to the health factor (step S27). Specifically, the cognitive function deterioration factor estimation unit 46 estimates the variation ΔLhealth of the cognitive function due to the health factor by Formula (2). Although not described in the flowchart, the estimated variation amount ΔLhealth of the cognitive function due to the health factor is stored in the cognitive function storage unit 45 in association with the information specifying the driver.

$$\Delta Lhealth = Lhour(t) - Lmonth(t) \tag{2}$$

The cognitive function deterioration factor estimation unit 46 estimates a change in the cognitive function due to the skill factor (step S28). Specifically, the cognitive function deterioration factor estimation unit 46 estimates the variation amount ΔLskill of the cognitive function due to the skill factor by Formula (3). Although not described in the flowchart, the estimated variation ΔLskill of the cognitive function due to the skill factor is stored in the cognitive function storage unit 45 in association with the information specifying the driver. Note that, since the influence of the road environment in which the vehicle is traveling at that time is large as the skill factor, it is desirable that the driver assistance device 10 acquires information regarding the road environment for the past one minute, for example, from a car navigation system, a surrounding camera, or the like, and also store the acquired information regarding the road environment in the cognitive function storage unit 45.

$$\Delta Lskill = Lminute(t) - (L\max + \Delta Lage + \Delta Lhealth) \tag{3}$$

The cognitive function deterioration factor estimation unit 46 compares the magnitude of the variation amount ΔLage of the cognitive function due to the aging factor, the magnitude of the variation amount ΔLhealth of the cognitive function due to the health factor, and the magnitude of the variation amount ΔLskill of the cognitive function due to the skill factor, thereby estimating the main factor that causes the cognitive function level L (t) to decrease (step S29). Thereafter, the cognitive function deterioration factor estimation unit 46 ends the processing of FIG. 21.

(Flow of Processing Performed by Driver Assistance Device)

Figure 22:
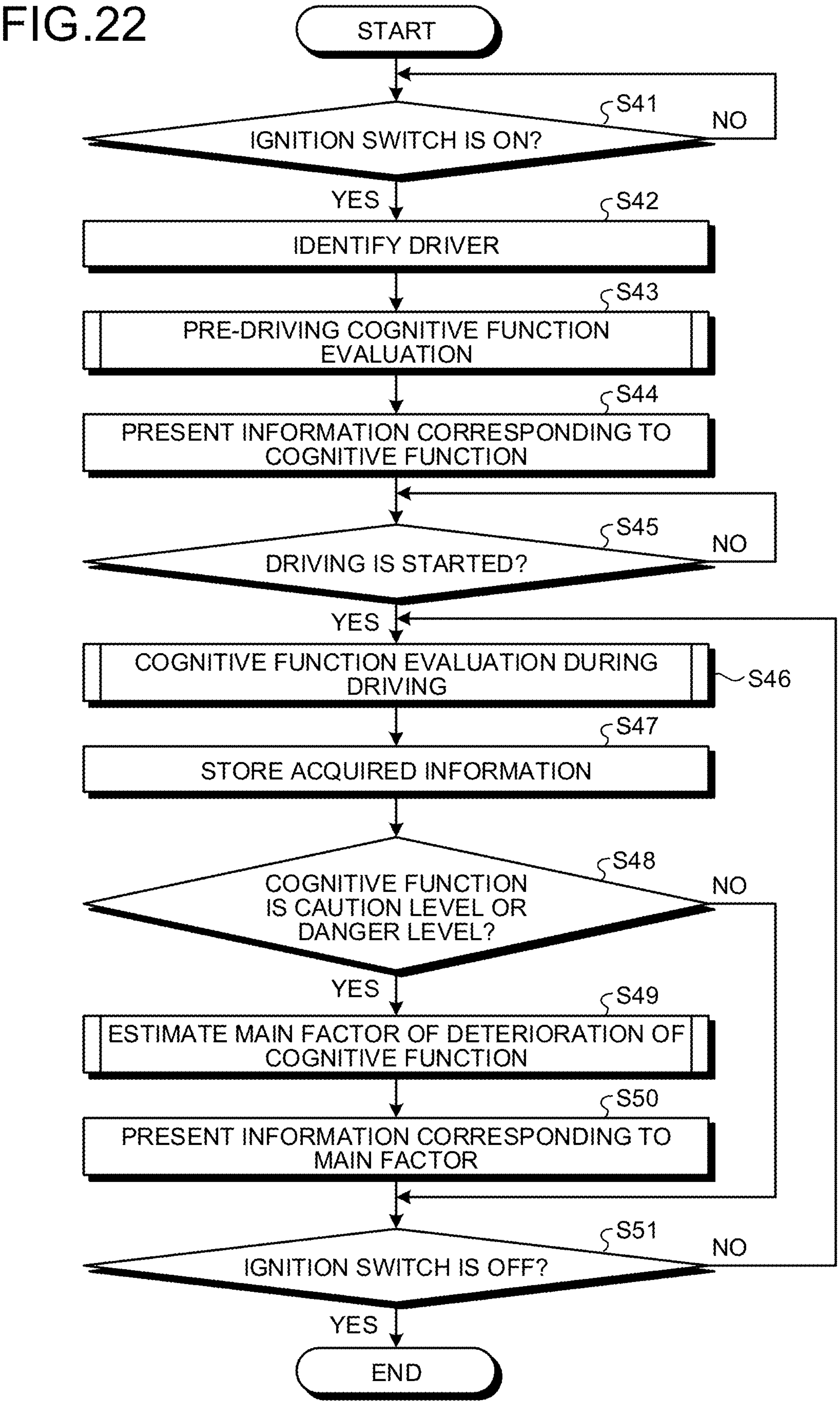
FIG. 22 is a flowchart illustrating an example of a flow of processing performed by the driver assistance device according to the present embodiment.

A flow of processing performed by the driver assistance device 10 according to the present embodiment will be described with reference to FIG. 22. FIG. 22 is a flowchart illustrating an example of a flow of processing performed by the driver assistance device according to the present embodiment.

The driving state detection unit 42 determines whether an ignition switch of the vehicle 30 is on (step S41). When it is determined that the ignition switch of the vehicle 30 is on (step S41: Yes), the process proceeds to step S42. On the other hand, when it is not determined that the ignition switch of the vehicle 30 is on (step S41: No), the determination in step S41 is repeated. When the vehicle 30 is an electric driver, it is only required to determine whether the main switch is on instead of determining whether the ignition switch is on.

When it is determined in step S41 that the ignition switch of the vehicle 30 is on, the driver identification unit 41 identifies the driver (step S42).

The cognitive function score calculation unit 43 performs pre-driving cognitive function evaluation on the driver (step S43). In the pre-driving cognitive function evaluation, for example, the evaluation result of the past cognitive function of the driver stored in the cognitive function storage unit 45 is read, and the transition from the past of the cognitive function of the driver is acquired. In addition, by acquiring an output of a sensor that measures the body temperature, the electrocardiogram, the pulse wave, and the like of the driver, the cognitive function is evaluated based on the health information of the driver before the start of driving.

The cognitive function characteristic output unit 47 presents the result of the evaluation in step S43 to the driver (step S44).

The driving state detection unit 42 determines whether driving of the vehicle 30 is started (step S45). When it is determined that driving of the vehicle 30 has been started (step S45: Yes), the process proceeds to step S46. On the other hand, when it is not determined that driving of the vehicle 30 has been started (step S45: No), the determination of step S45 is repeated.

The cognitive function score calculation unit 43 and the cognitive function characteristic analysis unit 44 evaluate the cognitive function of the driver during driving (step S46). The cognitive function evaluation during the driving is performed, for example, along the flowchart of FIG. 7.

The cognitive function storage unit 45 stores the analysis result in step S46 in association with the information for identifying the driver (step S47).

The cognitive function characteristic analysis unit 44 determines whether the evaluation score E (or the cognitive function level L (t)) of the cognitive function level calculated in step S46 is a caution level or a danger level (step S48). When it is determined that the evaluation score E of the cognitive function level is the caution level or the danger level (step S48: Yes), the process proceeds to step S49. On the other hand, when it is not determined that the evaluation score E of the cognitive function level is the caution level or the danger level (step S48: No), the process proceeds to step S51.

When it is determined in step S48 that the evaluation score E of the cognitive function level is the caution level or the danger level, the cognitive function deterioration factor estimation unit 46 estimates a main factor of the cognitive function deterioration (step S49). The main factor of the cognitive function deterioration is estimated, for example, along the flowchart of FIG. 21.

The cognitive function characteristic output unit 47 presents information corresponding to the main factor of the cognitive function deterioration to the driver (step S50). Examples of the information to be presented are as described with reference to FIGS. 16 to 19. Note that, in step S50, the cognitive function characteristic output unit 47 may output the state of the cognitive function of the driver to a smartphone, a wearable terminal, or the like registered in advance via the communication interface 27 (refer to FIG. 3). By referring to the information output in this manner, it is possible to use the information for daily health management and life management of the driver.

The driving state detection unit 42 determines whether an ignition switch of the vehicle 30 is off (step S51). When it is determined that the ignition switch of the vehicle 30 is off (step S51: Yes), the driver assistance device 10 ends the processing of FIG. 22. On the other hand, when it is not determined that the ignition switch of the vehicle 30 is off (step S51: No), the process returns to step S46.

(Execute Training Mode and Driving Assistance Mode when Cognitive Function is Decelerated)

Figure 23:
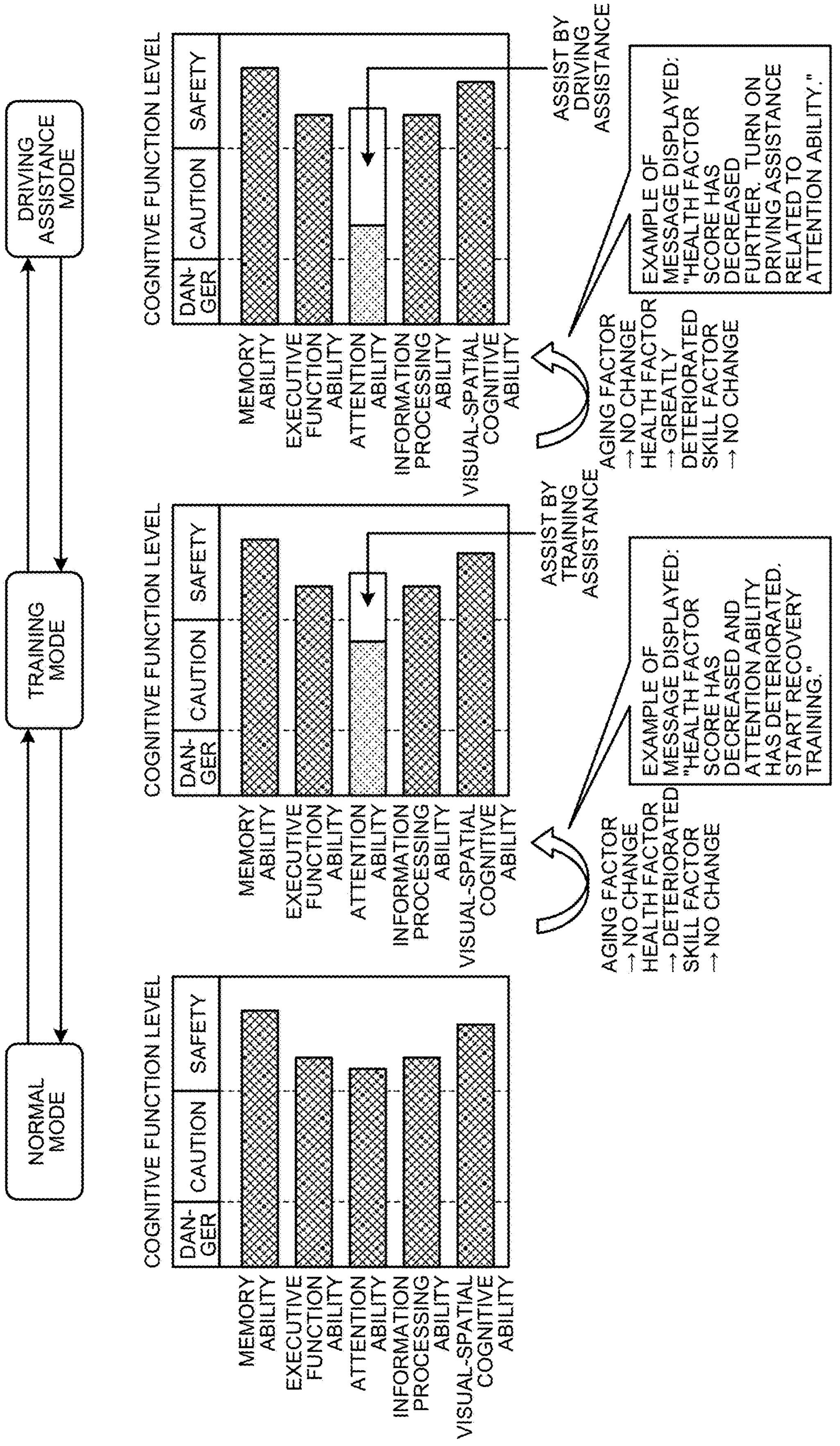
FIG. 23 is a diagram for explaining a function of presenting information related to a main factor of deterioration in the cognitive function when the driver assistance device changes an operation mode.

When transitioning to the training mode or the driving assistance mode, the driver assistance device 10 of the present embodiment may perform information presentation related to a main factor of deterioration in the cognitive function. FIG. 23 is a diagram for explaining a function of presenting information related to a main factor of deterioration in the cognitive function when the driver assistance device changes an operation mode.

When the assistance content determination unit 48 of the driver assistance device 10 determines to operate the training mode in order to suppress further deterioration of the cognitive function characteristics of the driver, the assistance information presentation unit 50 may present, to the driver, a main factor of deterioration in the cognitive function.

For example, as illustrated in FIG. 23, it is assumed that the driver assistance device 10 activates the training mode to determine to improve the function related to the attention ability of the driver when it is detected that the attention ability among the cognitive functions has deteriorated to the caution level. At this time, in a case where the cognitive function of the driver has deteriorated due to the health factor, the assistance information presentation unit 50 presents information related to the main factor in which the cognitive function has deteriorated, such as "The health factor score has decreased, and the attention ability has deteriorated. Start recovery training", for example, to the driver, that is, information for allowing the driver to realize that the driver is in a poor health and calling attention.

When the assistance content determination unit 48 of the driver assistance device 10 determines to operate the driving assistance mode in order to assist the driving operation associated with the cognitive function characteristics, the assistance information presentation unit 50 may present the driver with a main factor of the deterioration in the cognitive function.

For example, as illustrated in FIG. 23, when it is detected that attention ability among the cognitive functions has deteriorated to the caution level, it is assumed that the driver assistance device 10 activates the driving assistance mode to compensate for the decrease in the cognitive function related to the attention ability of the driver. At this time, when the cognitive function of the driver has deteriorated due to the health factor, the assistance information presentation unit 50 presents information related to the main factor in which the cognitive function has deteriorated, such as "The health factor score has further decreased. Turn on driving assistance related to attention ability.", to the driver.

Note that the driver assistance device 10 presents information related to the main factor of the deterioration in the cognitive function to the driver at the timing of transition to the training mode or the driving assistance mode.

Action and Effect of Embodiment

As described above, the driver assistance device 10 according to the present embodiment includes: the driving state detection unit 42 that detects at least one of the driving behaviors of the vehicle by the driver, the biological information during driving of the driver, and the behavior of the vehicle 30; the cognitive function score calculation unit 43 that calculates a numerical value indicating whether a cognitive function of the driver is high or low based on the information detected by the driving state detection unit 42; the cognitive function characteristic analysis unit 44 that analyzes the numerical value calculated by the cognitive function score calculation unit 43 as a cognitive function characteristic related to one or more different brain functions; the cognitive function storage unit 45 that stores, in time series, the numerical value for the same driver calculated by the cognitive function score calculation unit 43 and the analysis result of the cognitive function characteristic analysis unit 44; the cognitive function deterioration factor estimation unit 46 that calculates degrees of influence of a plurality of variation factors that cause deterioration in the cognitive function of the driver and estimates the main factor, based on the stored content of the cognitive function storage unit 45; and the driver assistance unit 60 that assists the driver based on an estimation result by the cognitive function deterioration factor estimation unit 46 or information corresponding to the estimation result. Therefore, it is possible to estimate a factor of deteriorating the cognitive function of the driver.

In addition, in the driver assistance device 10 of the present embodiment, the cognitive function deterioration factor estimation unit 46 estimates the variation factor of the cognitive function by comparing the stored content corresponding to the present in the cognitive function storage unit 45 with the stored content corresponding to a predetermined past time point. Therefore, it is possible to easily estimate the variation in the cognitive state of the driver with high accuracy based on the information regarding the cognitive function over time.

In addition, in the driver assistance device 10 of the present embodiment, the variation factor includes at least one of an aging factor 90, a health factor 91, and a skill factor 92 of the driver. Therefore, the variation factor of the cognitive function of the driver can be estimated in association with the physical state or the mental state of the driver.

In addition, in the driver assistance device 10 of the present embodiment, the driver assistance unit 60 includes a cognitive function characteristic output unit 47 (output unit) that outputs information corresponding to the estimation result of the cognitive function deterioration factor estimation unit 46 in a form corresponding to a past numerical value related to a main factor that causes deterioration in the cognitive function of the driver and a current numerical value related to the main factor. Therefore, when the cognitive function deteriorates, the driver can be caused to accurately recognize his/her own state by presenting information corresponding to the deterioration amount.

In addition, in the driver assistance device 10 of the present embodiment, when the aging factor 90 is a main factor that causes the deterioration in the cognitive function of the driver, the cognitive function characteristic output unit 47 (output unit) outputs, to the driver, information indicating that there is a cognitive function deterioration due to aging or information related to recovery training for the cognitive function deterioration due to the aging. Therefore, it is possible to reliably transmit to the driver that the cognitive function has deteriorated due to the aging.

In addition, in the driver assistance device 10 of the present embodiment, when the health factor 91 is a main factor that causes the deterioration in the cognitive function of the driver, the cognitive function characteristic output unit 47 (output unit) outputs, to the driver, information that causes the driver to realize that the driver is in a poor health and to call attention or information that prompts a break. Therefore, it is possible to reliably transmit to the driver that the cognitive function has deteriorated due to the health.

In addition, in the driver assistance device 10 of the present embodiment, when the skill factor 92 is a main factor that causes the deterioration in the cognitive function of the driver, the cognitive function characteristic output unit 47 (output unit) outputs, to the driver, information indicating that the driver is in a difficult road condition or proposes a route change avoiding the difficult road. Therefore, it is possible to reliably transmit to the driver that the cognitive function has deteriorated due to the driving skill.

In addition, in the driver assistance device 10 of the present embodiment, the driver assistance unit 60 further includes the assistance content determination unit 48 that determines, based on a comparison between the cognitive function characteristics calculated by the cognitive function characteristic analysis unit 44 and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle 30, and the cognitive function characteristic output unit 47 (output unit) outputs an estimation result by the cognitive function deterioration factor estimation unit 46 or information corresponding to the estimation result, at a timing when the assistance function determined by the assistance content determination unit 48 is enabled. Therefore, the reason for the transition to the training mode and the reason for the transition to the driving assistance mode can be reliably transmitted to the driver.

In addition, in the driver assistance device 10 of the present embodiment, the driver assistance unit 60 further includes the assistance content determination unit 48 that determines, based on a comparison between the cognitive function characteristics calculated by the cognitive function characteristic analysis unit 44 and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle 30, and the assistance content determination unit 48 assists the driver in a case where a difficult road condition extracted according to the estimation result of the skill factor in the cognitive function deterioration factor estimation unit 46 is on the travel route. Therefore, it is possible to support driving when the driver travels on the difficult road.

In addition, in the driver assistance device 10 of the present embodiment, the cognitive function characteristic output unit 47 (output unit) outputs information corresponding to the estimation result of the cognitive function deterioration factor estimation unit 46 to a device connected to the driver assistance device 10 via a network. Therefore, the variation in the estimation result of the cognitive function characteristics of the driver can be monitored by the mobile terminal outside the vehicle. As a result, the driver can use it for his/her health management. In addition, by transmitting the estimation result of the cognitive function characteristics of the driver to the hospital, it is possible to assist the doctor in guiding the life management of the driver.

Furthermore, in the driver assistance device 10 of the present embodiment, the cognitive function deterioration factor estimation unit 46 estimates the variation of the cognitive function related to the aging factor 90 based on a first average value of the evaluation scores E (numerical values) for the past one month (first predetermined period), estimates the variation of the cognitive function related to the health factor 91 based on a second average value of the evaluation scores E for the past one hour (second predetermined period) shorter than the first predetermined period, and estimates the variation of the cognitive function related to the skill factor 92 based on a third average value of the evaluation scores E for the past one minute (third predetermined period) shorter than the second predetermined period. Therefore, the main factor of the variation in the cognitive function can be estimated by simple calculation processing.

According to the driver assistance device of the present disclosure, it is possible to estimate a factor of deterioration in the cognitive function of a driver.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Note that the present disclosure may have the following configuration.

(1)

A driver assistance device including:

a driving state detection unit that detects at least one of driving behaviors of a vehicle by a driver, biological information during driving of the driver, and a behavior of the vehicle;

a cognitive function score calculation unit that calculates a numerical value indicating a level of a cognitive function of the driver based on the information detected by the driving state detection unit;

a cognitive function characteristic analysis unit that analyzes the numerical value calculated by the cognitive function score calculation unit as cognitive function characteristics related to one or more different brain functions;

a cognitive function storage unit that stores, in time series, the numerical value for the same driver calculated by the cognitive function score calculation unit and an analysis result of the cognitive function characteristic analysis unit;

a cognitive function deterioration factor estimation unit that calculates degrees of influence of a plurality of variation factors that cause deterioration in the cognitive function of the driver and estimates a main factor, based on a stored content of the cognitive function storage unit; and a driver assistance unit that assists the driver based on an estimation result by the cognitive function deterioration factor estimation unit or information corresponding to the estimation result.

(2)

The driver assistance device according to (1), in which the cognitive function deterioration factor estimation unit estimates a variation factor of the cognitive function by comparing a stored content corresponding to a present time in the cognitive function storage unit with a stored content corresponding to a predetermined past time point.

(3)

The driver assistance device according to (1) or (2), in which the variation factor includes at least one of an aging factor, a health factor, and a skill factor of the driver.

(4)

The driver assistance device according to any one of (1) to (3), in which the driver assistance unit further includes an output unit that outputs the information corresponding to the estimation result of the cognitive function deterioration factor estimation unit in a form corresponding to a past numerical value related to the main factor and a current numerical value related to the main factor.

(5)

The driver assistance device according to (4), in which when the aging factor is the main factor, the output unit outputs, to the driver, information indicating that there is a cognitive function deterioration due to aging or information related to recovery training for the cognitive function deterioration due to the aging.

(6)

The driver assistance device according to (4) or (5), in which when the health factor is the main factor, the output unit outputs, to the driver, information for causing the driver to realize that health is poor and calling attention or information for prompting break.

(7)

The driver assistance device according to any one of (4) to (6), in which when the skill factor is the main factor, the output unit outputs, to the driver, information indicating that the driver is in a difficult road condition or proposes a route change avoiding the difficult road.

(8)

The driver assistance device according to any one of (4) to (7), in which the driver assistance unit further includes an assistance content determination unit that determines, based on a comparison between the cognitive function characteristics calculated by the cognitive function characteristic analysis unit and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle, and the output unit outputs the estimation result by the cognitive function deterioration factor estimation unit or the information corresponding to the estimation result, at a timing when the assistance function determined by the assistance content determination unit is enabled.

(9)

The driver assistance device according to (7) or (8), in which the driver assistance unit further includes an assistance content determination unit that determines, based on a comparison between the cognitive function characteristics calculated by the cognitive function characteristic analysis unit and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle, and the assistance content determination unit assists the driver in a case where a difficult road condition extracted according to the estimation result of the skill factor in the cognitive function deterioration factor estimation unit is on a travel route.

(10)

The driver assistance device according to any one of (4) to (9), in which the output unit outputs the information corresponding to the estimation result of the cognitive function deterioration factor estimation unit to a device connected to the driver assistance device via a network.

(11)

The driver assistance device according to any one of (3) to (10), in which the cognitive function deterioration factor estimation unit estimates a variation of the cognitive function related to the aging factor based on a first average value of the numerical value over a first predetermined period, estimates a variation of the cognitive function related to the health factor based on a second average value of the numerical value over a second predetermined period shorter than the first predetermined period, and estimates a variation of the cognitive function related to the skill factor based on a third average value of the numerical values over a third predetermined period shorter than the second predetermined period.

(12)

A driver assistance system including:

a driving state detection unit that detects at least one of driving behaviors of a vehicle by a driver, biological information during driving of the driver, and a behavior of the vehicle;

a cognitive function score calculation unit that calculates a numerical value indicating a level of a cognitive function of the driver based on the information detected by the driving state detection unit;

a cognitive function characteristic analysis unit that analyzes the numerical value calculated by the cognitive function score calculation unit as cognitive function characteristics related to one or more different brain functions;

a cognitive function storage unit that stores, in time series, the numerical value for the same driver calculated by the cognitive function score calculation unit and an analysis result of the cognitive function characteristic analysis unit;

a cognitive function deterioration factor estimation unit that calculates degrees of influence of a plurality of variation factors that cause deterioration in the cognitive function of the driver and estimates a main factor, based on a stored content of the cognitive function storage unit; and a driver assistance unit that assists the driver based on an estimation result by the cognitive function deterioration factor estimation unit or information corresponding to the estimation result.

(13)

A driver assistance method including:

a driving state detection process of detecting at least one of driving behaviors of a vehicle by a driver, biological information during driving of the driver, and a behavior of the vehicle;

a cognitive function score calculation process of calculating a numerical value indicating a level of a cognitive function of the driver based on the information detected by the driving state detection process;

a cognitive function characteristic analysis process of analyzing the numerical value calculated by the cognitive function score calculation process as cognitive function characteristics related to one or more different brain functions;

a cognitive function storage process of storing, in time series, the numerical value for the same driver calculated by the cognitive function score calculation process and an analysis result of the cognitive function characteristic analysis process;

a cognitive function deterioration factor estimation process of calculating degrees of influence of a plurality of variation factors that cause deterioration in the cognitive function of the driver and estimating a main factor, based on a stored content of the cognitive function storage process; and a driver assistance process of assisting the driver based on an estimation result by the cognitive function deterioration factor estimation process or information corresponding to the estimation result.

What is claimed is:

1. A driver assistance device, comprising:

a memory; and a processor coupled to the memory and configured to detect at least one of driving behaviors of a vehicle by a driver, biological information during driving of the driver, or a behavior of the vehicle;

calculate a numerical value indicating a level of a cognitive function of the driver based on information detected by detecting the at least one of the driving behaviors, the biological information, or the behavior of the vehicle;

analyze the numerical value as cognitive function characteristics related to one or more different brain functions;

store, in time series, the numerical value for the driver and an analysis result of analyzing the numerical value;

calculate degrees of influence of a plurality of variation factors that cause deterioration in the cognitive function of the driver and estimate a main factor, based on a stored content resulting from storing, in time series, the numerical value and the analysis result; and assist the driver based on an estimation result by estimating the main factor, or information corresponding to the estimation result, wherein the main factor includes at least one of an aging factor, a health factor, or a skill factor of the driver.

2. The driver assistance device according to claim 1, wherein the processor is configured to estimate a variation factor of the cognitive function by comparing a stored content corresponding to a present time with a stored content corresponding to a predetermined past time point, resulting from storing, in time series, the numerical value and the analysis result.

3. The driver assistance device according to claim 1, wherein the processor is further configured to output the information corresponding to the estimation result in a form corresponding to a past numerical value related to the main factor and a current numerical value related to the main factor.

4. The driver assistance device according to claim 3, wherein the processor is configured to, when the aging factor is the main factor, output, to the driver, information indicating that there is a cognitive function deterioration due to aging or information related to recovery training for the cognitive function deterioration due to the aging.

5. The driver assistance device according to claim 3, wherein the processor is configured to, when the health factor is the main factor, output, to the driver, information for causing the driver to realize that health is poor and calling attention or information for prompting break.

6. The driver assistance device according to claim 3, wherein the processor is configured to, when the skill factor is the main factor, output, to the driver, information indicating that the driver is in a difficult road condition or propose a route change avoiding the difficult road.

7. The driver assistance device according to claim 6, wherein the processor is further configured to determine, based on a comparison between the cognitive function characteristics and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle, and the processor is configured to assist the driver in a case where a difficult road condition extracted according to the estimation result of the skill factor is on a travel route.

8. The driver assistance device according to claim 3, wherein the processor is further configured to:

determine, based on a comparison between the cognitive function characteristics and a threshold, whether to enable an information providing function that assists information provision for suppressing further deterioration of the cognitive function of the driver or to enable a driving assistance function that assists a driving operation associated with the deteriorated cognitive function characteristics, from among a plurality of functions of the vehicle; and output the estimation result or the information corresponding to the estimation result, at a timing when an assistance function determined to be enabled is enabled.

9. The driver assistance device according to claim 3, wherein the processor is configured to output the information corresponding to the estimation result to a device connected to the driver assistance device via a network.

10. The driver assistance device according to claim 1, wherein the processor is configured to:

estimate a variation of a first cognitive function related to the aging factor based on a first average value of the numerical value over a first predetermined period;

estimate a variation of a second cognitive function related to the health factor based on a second average value of the numerical value over a second predetermined period shorter than the first predetermined period, and estimate a variation of a third cognitive function related to the skill factor based on a third average value of the numerical values over a third predetermined period shorter than the second predetermined period.

11. A driver assistance system, comprising:

a memory; and a processor coupled to the memory and configured to detect at least one of driving behaviors of a vehicle by a driver, biological information during driving of the driver, or a behavior of the vehicle;

calculate a numerical value indicating a level of a cognitive function of the driver based on information detected by detecting the at least one of the driving behaviors, the biological information, or the behavior of the vehicle;

analyze the numerical value as cognitive function characteristics related to one or more different brain functions;

store, in time series, the numerical value for the driver and an analysis result of analyzing the numerical value;

calculate degrees of influence of a plurality of variation factors that cause deterioration in the cognitive function of the driver and estimate a main factor, based on a stored content resulting from storing, in time series, the numerical value and the analysis result; and assist the driver based on an estimation result by estimating the main factor, or information corresponding to the estimation result, wherein the variation factor includes at least one of an aging factor, a health factor, or a skill factor of the driver.

12. A driver assistance method, comprising:

detecting at least one of driving behaviors of a vehicle by a driver, biological information during driving of the driver, or a behavior of the vehicle;

calculating a numerical value indicating a level of a cognitive function of the driver based on information detected by detecting the at least one of the driving behaviors, the biological information, or the behavior of the vehicle;

analyzing the numerical value calculated as cognitive function characteristics related to one or more different brain functions;

storing, in time series, the numerical value for the driver and an analysis result of analyzing the numerical value;

calculating degrees of influence of a plurality of variation factors that cause deterioration in the cognitive function of the driver and estimating a main factor, based on a stored content resulting from storing, in time series, the numerical value and the analysis result; and assisting the driver based on an estimation result by estimating the main factor, wherein the variation factor includes at least one of an aging factor, a health factor, or a skill factor of the driver.

* * * * *